US012483904B2

(12) United States Patent
Huang et al.

(10) Patent No.: US 12,483,904 B2
(45) Date of Patent: Nov. 25, 2025

(54) CHANNEL STATE INFORMATION REPORTING TECHNIQUES FOR WIDE BEAMS

(71) Applicant: QUALCOMM Incorporated, San Diego, CA (US)

(72) Inventors: Min Huang, Beijing (CN); Jing Dai, Beijing (CN); Chao Wei, Beijing (CN)

(73) Assignee: QUALCOMM Incorporated, San Diego, CA (US)

( * ) Notice: Subject to any disclaimer, the term of this patent is extended or adjusted under 35 U.S.C. 154(b) by 372 days.

(21) Appl. No.: 17/999,699

(22) PCT Filed: Jul. 20, 2020

(86) PCT No.: PCT/CN2020/103048
§ 371 (c)(1),
(2) Date: Nov. 22, 2022

(87) PCT Pub. No.: WO2022/016321
PCT Pub. Date: Jan. 27, 2022

(65) Prior Publication Data
US 2023/0217265 A1    Jul. 6, 2023

(51) Int. Cl.
*H04W 16/28* (2009.01)
*H04B 7/06* (2006.01)
(Continued)

(52) U.S. Cl.
CPC .......... *H04W 16/28* (2013.01); *H04B 7/0626* (2013.01); *H04L 5/0051* (2013.01); *H04W 24/10* (2013.01)

(58) Field of Classification Search
CPC .... H04W 16/28; H04W 24/10; H04B 7/0626; H04B 7/063; H04B 7/0617; H04L 5/0051
See application file for complete search history.

(56) References Cited

U.S. PATENT DOCUMENTS

2017/0070277 A1*  3/2017  Si .................. H04B 7/0626
2017/0134082 A1*  5/2017  Onggosanusi ....... H04B 7/0639
(Continued)

FOREIGN PATENT DOCUMENTS

CN    104955061 A    9/2015
CN    108810918 A    11/2018

OTHER PUBLICATIONS

International Search Report and Written Opinion—PCT/CN2020/103048—ISA/EPO—Apr. 16, 2021 (206313WO1).
(Continued)

*Primary Examiner* — Fahmida S Chowdhury
(74) *Attorney, Agent, or Firm* — Holland & Hart LLP/Qualcomm Incorporated

(57) ABSTRACT

Methods, systems, and devices for wireless communications are described in which a user equipment (UE) may determine wide beam parameters for beamformed communications with a base station based on an identified narrow beam. A UE may receive a reference signal from a base station and identify a narrow beam based on measurements of the received reference signal. Based on the identified narrow beam, the UE may determine a set of wide beam parameters for a wide beam that is to be used for communications between the UE and the base station. The wide beam may have a beam direction that corresponds to a direction of the identified narrow beam, and may have a beam width that is determined as a multiple of a beam width of the identified narrow beam (e.g., x times the beam width of the narrow beam).

35 Claims, 19 Drawing Sheets

(51) Int. Cl.
*H04L 5/00* (2006.01)
*H04W 24/10* (2009.01)

(56) References Cited

U.S. PATENT DOCUMENTS

| | | | |
|---|---|---|---|
| 2017/0195894 A1* | 7/2017 | Wen | H04W 16/28 |
| 2017/0347276 A1* | 11/2017 | Yu | H04B 7/0617 |
| 2018/0006702 A1* | 1/2018 | Doostnejad | H04B 7/088 |
| 2018/0138950 A1* | 5/2018 | Rahman | H04B 7/0626 |
| 2018/0212662 A1* | 7/2018 | Ren | H04B 7/0479 |
| 2018/0309496 A1* | 10/2018 | Lee | H04L 5/0053 |
| 2019/0132827 A1 | 5/2019 | Kundargi et al. | |
| 2019/0132828 A1* | 5/2019 | Kundargi | H04B 17/318 |
| 2019/0181930 A1* | 6/2019 | Liu | H04B 7/0456 |
| 2019/0190569 A1* | 6/2019 | Nayeb Nazar | H04B 7/0639 |
| 2019/0280748 A1* | 9/2019 | Cirkic | H04L 5/0007 |
| 2019/0335367 A1* | 10/2019 | Yue | H04W 36/0016 |
| 2019/0335475 A1* | 10/2019 | Liang | H04W 72/541 |
| 2020/0037332 A1* | 1/2020 | da Silva | H04W 76/18 |
| 2020/0213872 A1* | 7/2020 | Campos | H04W 64/00 |
| 2021/0013954 A1* | 1/2021 | Zhao | H04L 5/005 |
| 2021/0185547 A1* | 6/2021 | Zhao | H04W 72/046 |
| 2021/0212123 A1* | 7/2021 | Reial | H04B 7/0617 |
| 2022/0095307 A1* | 3/2022 | Chen | H04L 5/0055 |
| 2023/0036727 A1* | 2/2023 | Gebremariam | H04W 36/322 |
| 2023/0217265 A1* | 7/2023 | Huang | H04B 7/0617 370/329 |

OTHER PUBLICATIONS

National Instruments: "Discussion on Nested Usage of RS for Beam Measurement", 3GPP Draft, 3GPP TSG RAN WG1 Meeting #89, R1-1708270, Discussion on Nested Usage of RS for Beam Measurement Final, 3rd Generation Partnership Project (3GPP), Mobile Competence Centre, 650, Route Des Lucioles ; F-06921 Sophia-Antipolis Cedex, France, vol. RAN WG1, No. Hangzhou; May 15, 2017-May 19, 2017, May 14, 2017 (May 14, 2017), pp. 1-5, XP051273463.

* cited by examiner

CHANNEL STATE INFORMATION REPORTING TECHNIQUES FOR WIDE BEAMS

CROSS REFERENCE

The present application is a 371 national stage filing of International PCT Application No. PCT/CN2020/103048 by HUANG et al. entitled "CHANNEL STATE INFORMATION REPORTING TECHNIQUES FOR WIDE BEAMS," filed Jul. 20, 2020, which is assigned to the assignee hereof, and which is expressly incorporated by reference in its entirety herein.

FIELD OF TECHNOLOGY

The following relates to wireless communications, including channel state information reporting techniques for wide beams.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

SUMMARY

The described techniques relate to improved methods, systems, devices, and apparatuses that support channel state information reporting techniques for wide beams. In some cases, mobility of a user equipment (UE) may result in beams used for communications that change relatively quickly. Further, an identified beam may be a relatively narrow beam and movement of the UE between a time that the beam is identified and a data transmission may result in degradation of beam quality. In accordance with various aspects, a relatively wide beam may be identified for communications that may provide enhanced beam quality for a relatively high mobility UE between reference signal reports that may identify beams for communications.

In some cases, a UE may receive a reference signal from a base station (e.g., a channel state information (CSI) reference signal (RS)) and identify a narrow beam based on measurements of the received reference signal. Based on the identified narrow beam, the UE may determine a set of wide beam parameters for a wide beam that is to be used for communications between the UE and the base station. In some cases, the wide beam may have a beam direction that corresponds to a direction of the identified narrow beam, and may have a beam width that is determined as a multiple of a beam width of the identified narrow beam (e.g., x times the beam width of the narrow beam). In some cases, the wide beam parameters may include a horizontal beam direction value (e.g., a horizontal angle relative to a reference angle), a vertical beam direction value, a horizontal beam width (e.g., a multiple of the identified narrow beam horizontal beam width), and a vertical beam width. In some cases, one or more channel parameters may also be provided with the wide beam parameters.

A method of wireless communications at a UE is described. The method may include measuring a reference signal from a base station using two or more beamforming parameters for two or more antennas to identify at least a first narrow beam with a beamforming gain that exceeds beamforming gains of one or more other narrow beams, where the first narrow beam has a first beam direction and a first beam width, determining a second beam direction and a second beam width for a first wide beam, where the second beam direction is based on the first beam direction and the second beam width is a multiple of the first beam width, and transmitting a set of wide beam parameters to the base station that indicate the second beam direction and the second beam width of the first wide beam.

An apparatus for wireless communications at a UE is described. The apparatus may include a processor, memory coupled with the processor, and instructions stored in the memory. The instructions may be executable by the processor to cause the apparatus to measure a reference signal from a base station using two or more beamforming parameters for two or more antennas to identify at least a first narrow beam with a beamforming gain that exceeds beamforming gains of one or more other narrow beams, where the first narrow beam has a first beam direction and a first beam width, determine a second beam direction and a second beam width for a first wide beam, where the second beam direction is based on the first beam direction and the second beam width is a multiple of the first beam width, and transmit a set of wide beam parameters to the base station that indicate the second beam direction and the second beam width of the first wide beam.

Another apparatus for wireless communications at a UE is described. The apparatus may include means for measuring a reference signal from a base station using two or more beamforming parameters for two or more antennas to identify at least a first narrow beam with a beamforming gain that exceeds beamforming gains of one or more other narrow beams, where the first narrow beam has a first beam direction and a first beam width, determining a second beam direction and a second beam width for a first wide beam, where the second beam direction is based on the first beam direction and the second beam width is a multiple of the first beam width, and transmitting a set of wide beam parameters to the base station that indicate the second beam direction and the second beam width of the first wide beam.

A non-transitory computer-readable medium storing code for wireless communications at a UE is described. The code may include instructions executable by a processor to measure a reference signal from a base station using two or more beamforming parameters for two or more antennas to identify at least a first narrow beam with a beamforming gain that exceeds beamforming gains of one or more other narrow beams, where the first narrow beam has a first beam direction and a first beam width, determine a second beam direction and a second beam width for a first wide beam, where the second beam direction is based on the first beam direction and the second beam width is a multiple of the first beam width, and transmit a set of wide beam parameters to the base station that indicate the second beam direction and the second beam width of the first wide beam.

Some examples of the method, apparatuses, and non-transitory computer-readable medium described herein may further include operations, features, means, or instructions for receiving, from the base station, configuration information for the reference signal and a wide beam parameter report for providing the set of wide beam parameters. In some examples of the method, apparatuses, and non-transitory computer-readable medium described herein, the wide beam parameter report may be provided in a CSI report that includes values for the second beam direction and the second beam width. In some examples of the method, apparatuses, and non-transitory computer-readable medium described herein, the second beam direction may be an angle value of the first narrow beam that has a largest beamforming gain of the one or more other narrow beams, and is represented by an angle value in the CSI report. In some examples of the method, apparatuses, and non-transitory computer-readable medium described herein, the second beam width may be represented by the multiple of the first beam width that is generated by transmit antennas of the first narrow beam at the first beam direction.

In some examples of the method, apparatuses, and non-transitory computer-readable medium described herein, the transmitting may include operations, features, means, or instructions for transmitting a CSI report that indicates a vertical beam direction, a vertical beam width, a horizontal beam direction, and a horizontal beam width of the first wide beam. In some examples of the method, apparatuses, and non-transitory computer-readable medium described herein, the transmitting may include operations, features, means, or instructions for transmitting the set of wide beam parameters for each of two or more transmission layers. In some examples of the method, apparatuses, and non-transitory computer-readable medium described herein, the transmitting may include operations, features, means, or instructions for transmitting one or more of a channel quality indicator value, a precoding matrix index value, a rank index value, or combinations thereof, that is associated with the set of wide beam parameters.

Some examples of the method, apparatuses, and non-transitory computer-readable medium described herein may further include operations, features, means, or instructions for receiving one or more downlink communications from the base station using a wide beam precoding matrix that is determined based on the set of wide beam parameters. In some examples of the method, apparatuses, and non-transitory computer-readable medium described herein, the second beam direction and the second beam width are determined based on a type-1 precoding codebook or a type-two precoding codebook that is configured by the base station. In some examples of the method, apparatuses, and non-transitory computer-readable medium described herein, the set of wide beam parameters is transmitted to the base station in an enhanced precoding matrix indicator (PMI) report.

In some examples of the method, apparatuses, and non-transitory computer-readable medium described herein, the set of wide beam parameters may be determined and reported for two or more transmission layers, for two or more communication bandwidths, for two or more sub-bands of a set of sub-bands, or any combinations thereof. Some examples of the method, apparatuses, and non-transitory computer-readable medium described herein may further include operations, features, means, or instructions for receiving, from the base station, configuration information via radio resource control (RRC) signaling, a medium access control (MAC) control element (MAC-CE), DCI, or any combinations thereof, where the configuration information provides a CSI report configuration for determining the second beam direction and the second beam width, and for transmitting the set of wide beam parameters to the base station. In some examples of the method, apparatuses, and non-transitory computer-readable medium described herein, the reference signal may be a channel state information reference signal (CSI-RS) that may be transmitted without precoding.

In some examples of the method, apparatuses, and non-transitory computer-readable medium described herein, the set of wide beam parameters include values for vertical beam direction and horizontal beam direction that are quantized based on a number of antenna elements at the UE, oversampling factors for vertical or horizontal beam directions, or any combinations thereof. In some examples of the method, apparatuses, and non-transitory computer-readable medium described herein, the set of wide beam parameters include values for vertical beam width and horizontal beam width that are quantized based on upper bounds for beam broadening for the vertical or horizontal beam directions, or any combinations thereof. In some examples of the method, apparatuses, and non-transitory computer-readable medium described herein, the set of wide beam parameters include separate horizontal and vertical beam direction values, and separate horizontal and vertical width values, for each of two or more transmission layers. In some examples of the method, apparatuses, and non-transitory computer-readable medium described herein, the set of wide beam parameters include separate horizontal and vertical beam direction values, and separate horizontal and vertical width values, for each of two or more sub-bands. In some examples of the method, apparatuses, and non-transitory computer-readable medium described herein, the set of wide beam parameters include a set of indices for each of the two or more sub-bands and each transmission layer. In some examples of the method, apparatuses, and non-transitory computer-readable medium described herein, the set of wide beam parameters include a set of indices for a wide band of each transmission layer.

In some examples of the method, apparatuses, and non-transitory computer-readable medium described herein, the set of wide beam parameters for each sub-band may be reported as differential values relative to values of the wide band. In some examples of the method, apparatuses, and non-transitory computer-readable medium described herein, the set of wide beam parameters for a first subset of sub-bands are reported as differential values relative to values of a wide band, and the set of wide beam parameters for a second subset of sub-bands are reported as actual values of the wide beam parameters. In some examples of the method, apparatuses, and non-transitory computer-readable medium described herein, the transmitting may include operations, features, means, or instructions for transmitting the set of wide beam parameters for a first subset of transmission layers, and transmitting one or more precoding codebook values for narrow beams for a second subset of transmission layers.

Some examples of the method, apparatuses, and non-transitory computer-readable medium described herein may further include operations, features, means, or instructions for selecting at least a first transmission layer for wide beam communications and at least a second transmission layer for narrow beam communications, and where the set of wide beam parameters includes an indication that identifies an associated transmission layer as being selected for wide beam communications. In some examples of the method, apparatuses, and non-transitory computer-readable medium described herein, the transmitting further may include operations, features, means, or instructions for determining a wide beam codebook index value associated with the second beam direction and the multiple that provides the second beam width, and transmitting the wide beam codebook index value to the base station to indicate the wide beam parameters. In some examples of the method, apparatuses, and non-transitory computer-readable medium described herein, a precoding vector for communications with the base station may be determined based on the wide beam codebook index value. Some examples of the method, apparatuses, and non-transitory computer-readable medium described herein may further include operations, features, means, or instructions for determining, based on the second beam direction and the second beam width, a wide beam precoding matrix, and transmitting a precoding matrix indicator (PMI) associated with the wide beam precoding matrix and a rank indicator (RI) value that indicates an associated transmission layer. Some examples of the method, apparatuses, and non-transitory computer-readable medium described herein may further include operations, features, means, or instructions for determining one or more channel quality indicator (CQI) values associated with the reference signal, and providing the one or more CQI values based on the PMI and the RI.

A method of wireless communications at a base station is described. The method may include transmitting a reference signal to a UE for beamforming measurements at the UE, the beamforming measurements based on a set of available narrow beams that include a first narrow beam that has a first beam direction and a first beam width, receiving from the UE, responsive to the reference signal, a set of wide beam parameters that indicate a second beam direction of a first wide beam and a second beam width of the first wide beam, where the second beam direction is based on the first beam direction and the second beam width is a multiple of the first beam width, and communicating with the UE using the first wide beam based on the set of wide beam parameters.

An apparatus for wireless communications at a base station is described. The apparatus may include a processor, memory coupled with the processor, and instructions stored in the memory. The instructions may be executable by the processor to cause the apparatus to transmit a reference signal to a UE for beamforming measurements at the UE, the beamforming measurements based on a set of available narrow beams that include a first narrow beam that has a first beam direction and a first beam width, receive from the UE, responsive to the reference signal, a set of wide beam parameters that indicate a second beam direction of a first wide beam and a second beam width of the first wide beam, where the second beam direction is based on the first beam direction and the second beam width is a multiple of the first beam width, and communicate with the UE using the first wide beam based on the set of wide beam parameters.

Another apparatus for wireless communications at a base station is described. The apparatus may include means for transmitting a reference signal to a UE for beamforming measurements at the UE, the beamforming measurements based on a set of available narrow beams that include a first narrow beam that has a first beam direction and a first beam width, receiving from the UE, responsive to the reference signal, a set of wide beam parameters that indicate a second beam direction of a first wide beam and a second beam width of the first wide beam, where the second beam direction is based on the first beam direction and the second beam width is a multiple of the first beam width, and communicating with the UE using the first wide beam based on the set of wide beam parameters.

A non-transitory computer-readable medium storing code for wireless communications at a base station is described. The code may include instructions executable by a processor to transmit a reference signal to a UE for beamforming measurements at the UE, the beamforming measurements based on a set of available narrow beams that include a first narrow beam that has a first beam direction and a first beam width, receive from the UE, responsive to the reference signal, a set of wide beam parameters that indicate a second beam direction of a first wide beam and a second beam width of the first wide beam, where the second beam direction is based on the first beam direction and the second beam width is a multiple of the first beam width, and communicate with the UE using the first wide beam based on the set of wide beam parameters.

Some examples of the method, apparatuses, and non-transitory computer-readable medium described herein may further include operations, features, means, or instructions for transmitting, to the UE prior to transmitting the reference signal, configuration information for the reference signal and a wide beam parameter report for providing the set of wide beam parameters. In some examples of the method, apparatuses, and non-transitory computer-readable medium described herein, the wide beam parameter report may be provided in a CSI report that includes values for the second beam direction and the second beam width. In some examples of the method, apparatuses, and non-transitory computer-readable medium described herein, the second beam direction may be an angle value of the first narrow beam that may have a largest beamforming gain of the set of available narrow beams, and may be represented by an angle value in the CSI report. In some examples of the method, apparatuses, and non-transitory computer-readable medium described herein, the second beam width may be represented by the multiple of the first beam width that is generated by UE transmit antennas of the first narrow beam at the first beam direction. In some examples of the method, apparatuses, and non-transitory computer-readable medium described herein, the receiving may include operations, features, means, or instructions for receiving a CSI report that indicates a vertical beam direction, a vertical beam width, a horizontal beam direction, and a horizontal beam width of the first wide beam.

In some examples of the method, apparatuses, and non-transitory computer-readable medium described herein, the receiving may include operations, features, means, or instructions for receiving the set of wide beam parameters for each of two or more transmission layers. In some examples of the method, apparatuses, and non-transitory computer-readable medium described herein, the receiving may include operations, features, means, or instructions for receiving one or more of a CQI value, a PMI value, a RI value, or combinations thereof, that may be associated with the set of wide beam parameters. In some examples of the method, apparatuses, and non-transitory computer-readable medium described herein, the second beam direction and the second beam width is determined based on a type-1 precoding codebook or a type-two precoding codebook that is configured at the UE by the base station. In some examples of the method, apparatuses, and non-transitory computer-readable medium described herein, the set of wide beam parameters may be received from the UE in an enhanced PMI report.

In some examples of the method, apparatuses, and non-transitory computer-readable medium described herein, the set of wide beam parameters may be provided for two or more transmission layers, for two or more communication bandwidths, for two or more sub-bands of a set of sub-bands, or any combinations thereof. Some examples of the method, apparatuses, and non-transitory computer-readable medium described herein may further include operations, features, means, or instructions for transmitting, to the UE, configuration information via RRC signaling, a MAC-CE, DCI, or any combinations thereof, where the configuration information provides a CSI report configuration for indication of the second beam direction and the second beam width, and for transmission of the set of wide beam parameters to the base station. In some examples of the method, apparatuses, and non-transitory computer-readable medium described herein, the reference signal may be a CSI-RS that is transmitted without precoding.

In some examples of the method, apparatuses, and non-transitory computer-readable medium described herein, the set of wide beam parameters include values for vertical beam direction and horizontal beam direction that are quantized based on a number of antenna elements at the UE, oversampling factors for vertical or horizontal beam directions, or any combinations thereof. In some examples of the method, apparatuses, and non-transitory computer-readable medium described herein, the set of wide beam parameters include values for vertical beam width and horizontal beam width that are quantized based on upper bounds for beam broadening for the vertical or horizontal beam directions, or any combinations thereof. In some examples of the method, apparatuses, and non-transitory computer-readable medium described herein, the set of wide beam parameters include separate horizontal and vertical beam direction values, and separate horizontal and vertical width values, for each of two or more transmission layers.

In some examples of the method, apparatuses, and non-transitory computer-readable medium described herein, the set of wide beam parameters include separate horizontal and vertical beam direction values, and separate horizontal and vertical width values, for each of two or more sub-bands. In some examples of the method, apparatuses, and non-transitory computer-readable medium described herein, the set of wide beam parameters include a set of indices for each of the two or more sub-bands and each transmission layer. In some examples of the method, apparatuses, and non-transitory computer-readable medium described herein, the set of wide beam parameters include a set of indices for a wide band of each transmission layer. In some examples of the method, apparatuses, and non-transitory computer-readable medium described herein, the set of wide beam parameters for each sub-band may be reported as differential values relative to values of the wide band.

In some examples of the method, apparatuses, and non-transitory computer-readable medium described herein, the set of wide beam parameters for a first subset of sub-bands may be reported as differential values relative to values of a wide band, and the set of wide beam parameters for a second subset of sub-bands may be reported as actual values of the wide beam parameters. In some examples of the method, apparatuses, and non-transitory computer-readable medium described herein, the receiving may include operations, features, means, or instructions for receiving the set of wide beam parameters for a first subset of transmission layers, and receiving one or more precoding codebook values for narrow beams for a second subset of transmission layers. In some examples of the method, apparatuses, and non-transitory computer-readable medium described herein, the UE may be configured to select at least a first transmission layer of a set of transmission layers for wide beam communications and at least a second transmission layer of the set of transmission layers for narrow beam communications, and where the set of wide beam parameters includes an indication that identifies an associated transmission layer as being selected for wide beam communications.

In some examples of the method, apparatuses, and non-transitory computer-readable medium described herein, the receiving further may include operations, features, means, or instructions for receiving a wide beam codebook index value associated with the second beam direction and the multiple that provides the second beam width, and determining the set of wide beam parameters based on the wide beam codebook index value. In some examples of the method, apparatuses, and non-transitory computer-readable medium described herein, a precoding vector for communications with the UE may be determined based on the wide beam codebook index value. Some examples of the method, apparatuses, and non-transitory computer-readable medium described herein may further include operations, features, means, or instructions for receiving, from the UE, a PMI associated with a wide beam precoding matrix and a RI value that indicates an associated transmission layer. Some examples of the method, apparatuses, and non-transitory computer-readable medium described herein may further include operations, features, means, or instructions for receiving one or more CQI values associated with the reference signal based on the PMI and the RI.

DETAILED DESCRIPTION

Figure 1:
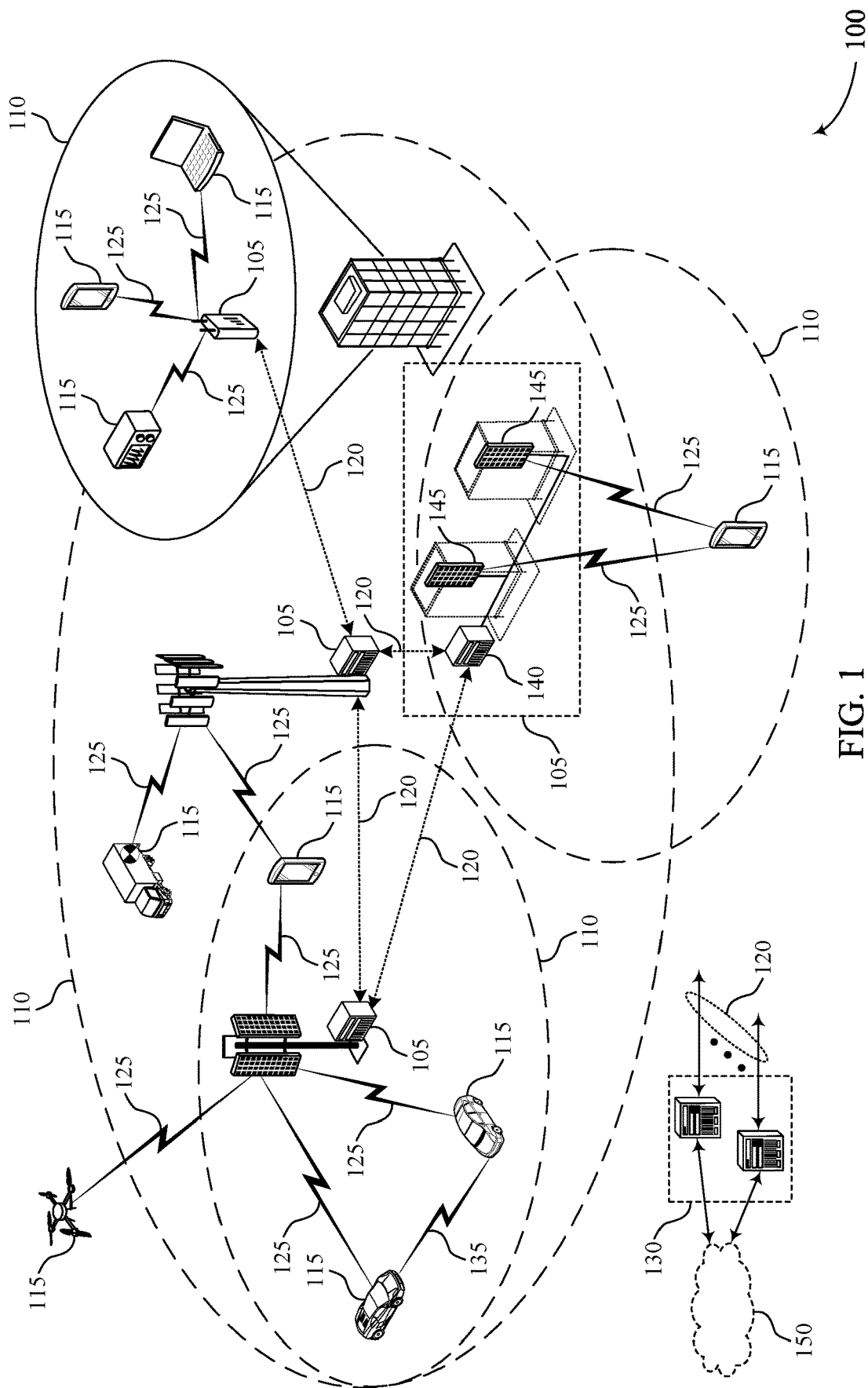
FIG. 1 illustrates an example of a system for wireless communications that supports channel state information reporting techniques for wide beams in accordance with aspects of the present disclosure.

Devices of a wireless communications system may support beamforming to enhance reliability and efficiency using directional signal transmission. For example, a base station and a user equipment (UE) may communicate using various beam pairs, and the devices may transition between beams based on reference signal measurements at the UE and a measurement report provided by the UE that indicates one or more beams for use in communications between the UE and base station. In some cases, a UE may move at a relatively high speed relative to a base station, which may result in relatively frequent beam switches. In some cases, selected beams may be identified based on a precoding matrix indication (PMI) provided by the UE that is associated with narrow beams according to a precoding codebook. In order to account for UE movement in such high mobility cases, some existing systems may provide that UEs may provide information for multiple beams in a CSI report, and the base station may transmit using a broader beam based on the indicated multiple beams. However, such additional beam information in measurement reports (e.g., in channel state information (CSI) reports) can add signaling overhead. Further, the base station in such instances may be unaware of which narrow beam should be used for CSI-RS transmission, which can degrade the quality of channel quality information (CQI) reported by the UE.

In accordance with various aspects discussed herein, wide beam parameters may be provided by a UE in a measurement report (e.g., in a CSI report), in which the wide beam parameters may be determined based on a selected narrow beam. In some cases, a UE may identify a first narrow beam that has a relatively high or acceptable gain (e.g., a highest beamforming gain), and report a beam direction associated with the first narrow beam as a wide beam direction. The UE may also report a wide beam width as a multiple of the first narrow beam width (e.g., a value of x times the narrow beam width). The base station may receive the wide beam parameters and configure beams for subsequent communications based on wide beams.

In some cases, the wide beam parameters may be reported separately for different transmission layers (e.g., for a number of layers of spatial multiplexing streams indicated by a rank indicator (RI)), for different sub-bands, or any combinations thereof. In some cases, one layer may be reported with wide beam parameters, and another layer may be reported with a codebook value for narrow beam parameters, and the UE may indicate which is reported based on a flag provided with the layer information in the measurement report. In some cases, the wide beam parameters may include a vertical beam angle, a horizontal beam angle, a vertical beam width, and a horizontal beam width. In some cases, the wide beam parameters may be quantized based on a number of antennas at the UE, a configured oversampling performed at the UE, configured upper bounds on beam broadening, or any combinations thereof.

Particular aspects of the subject matter described herein may be implemented to realize one or more advantages. The described techniques may support improvements in the beamforming communication framework, decreasing signaling overhead, and improving reliability, among other advantages. As such, supported techniques may include improved network operations and, in some examples, may promote network efficiencies, among other benefits.

Aspects of the disclosure are initially described in the context of wireless communications systems. Aspects of the disclosure are further illustrated by and described with reference to process flows, apparatus diagrams, system diagrams, and flowcharts that relate to channel state information reporting techniques for wide beams.

FIG. 1 illustrates an example of a wireless communications system 100 that supports channel state information reporting techniques for wide beams in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or a different radio access technology).

The communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a particular radio access technology (e.g., 1.4, 3, 5, 10, 15, 20, 40, or 80 megahertz (MHz)). Devices of the wireless communications system 100 (e.g., the base stations 105, the UEs 115, or both) may have hardware configurations that support communications over a particular carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

One or more numerologies for a carrier may be supported, where a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

Each base station 105 may provide communication coverage via one or more cells, for example a macro cell, a small cell, a hot spot, or other types of cells, or any combination thereof. The term "cell" may refer to a logical communication entity used for communication with a base station 105 (e.g., over a carrier) and may be associated with an identifier for distinguishing neighboring cells (e.g., a physical cell identifier (PCID), a virtual cell identifier (VCID), or others). In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of the base station 105. For example, a cell may be or include a building, a subset of a building, or exterior spaces between or overlapping with geographic coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered base station 105, as compared with a macro cell, and a small cell may operate in the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A base station 105 may support one or multiple cells and may also support communications over the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

In some systems, the D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., base stations 105) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to the network operators IP services 150. The operators IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may also operate in a super high frequency (SHF) region using frequency bands from 3 GHz to 30 GHz, also known as the centimeter band, or in an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the base stations 105, and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the base station 105 in different directions and may report to the base station 105 an indication of the signal that the UE 115 received with a highest signal quality or an otherwise acceptable signal quality.

In some examples, transmissions by a device (e.g., by a base station 105 or a UE 115) may be performed using multiple beam directions, and the device may use a combination of digital precoding or radio frequency beamforming to generate a combined beam for transmission (e.g., from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

In some cases, a UE 115 may receive a reference signal from a base station 105 (e.g., a CSI-RS) and identify a narrow beam based on measurements of the received reference signal. Based on the identified narrow beam, the UE 115 may determine a set of wide beam parameters for a wide beam that is to be used for communications between the UE 115 and the base station 105. In some cases, the wide beam may have a beam direction that corresponds to a direction of the identified narrow beam, and may have a beam width that is determined as a multiple of a beam width of the identified narrow beam (e.g., x times the beam width of the narrow beam). In some cases, the wide beam parameters may include a horizontal beam direction value (e.g., a horizontal angle relative to a reference angle), a vertical beam direction value, a horizontal beam width (e.g., a multiple of the identified narrow beam horizontal beam width), and a vertical beam width. In some cases, one or more channel parameters may also be provided with the wide beam parameters.

Figure 2A:
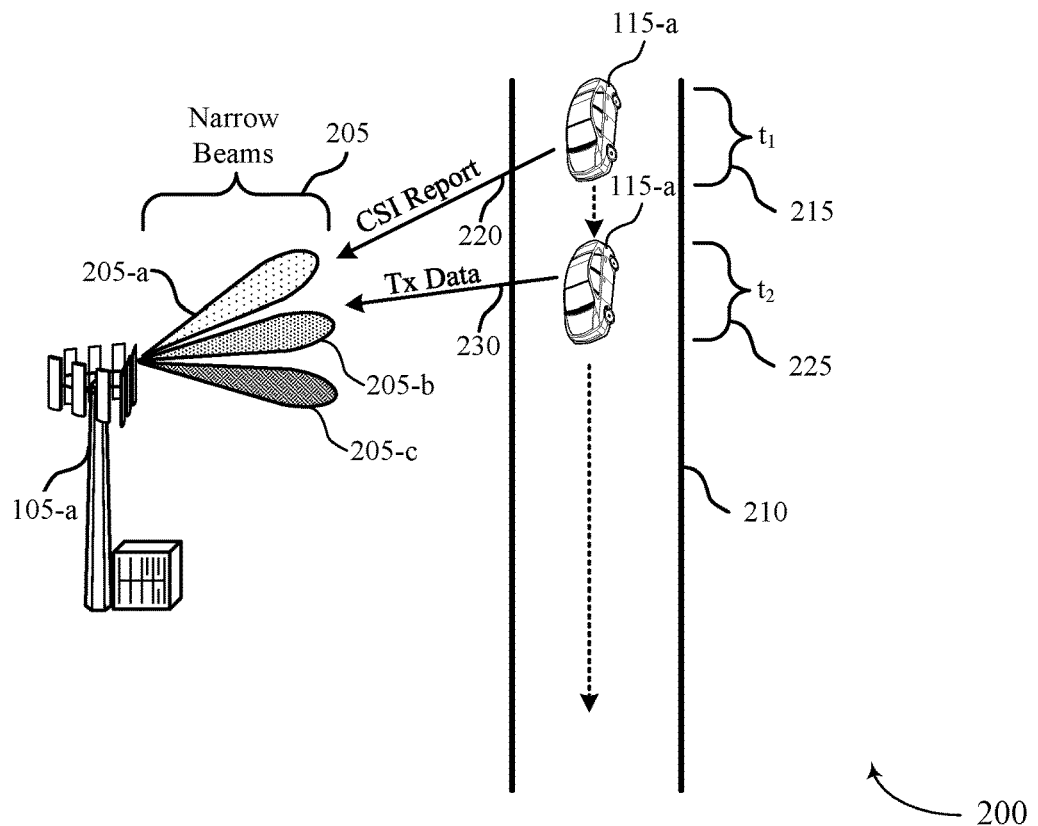
FIGS. 2A and 2B illustrate examples of a portion of a wireless communications system that supports channel state information reporting techniques for wide beams in accordance with aspects of the present disclosure.
Figure 2B:
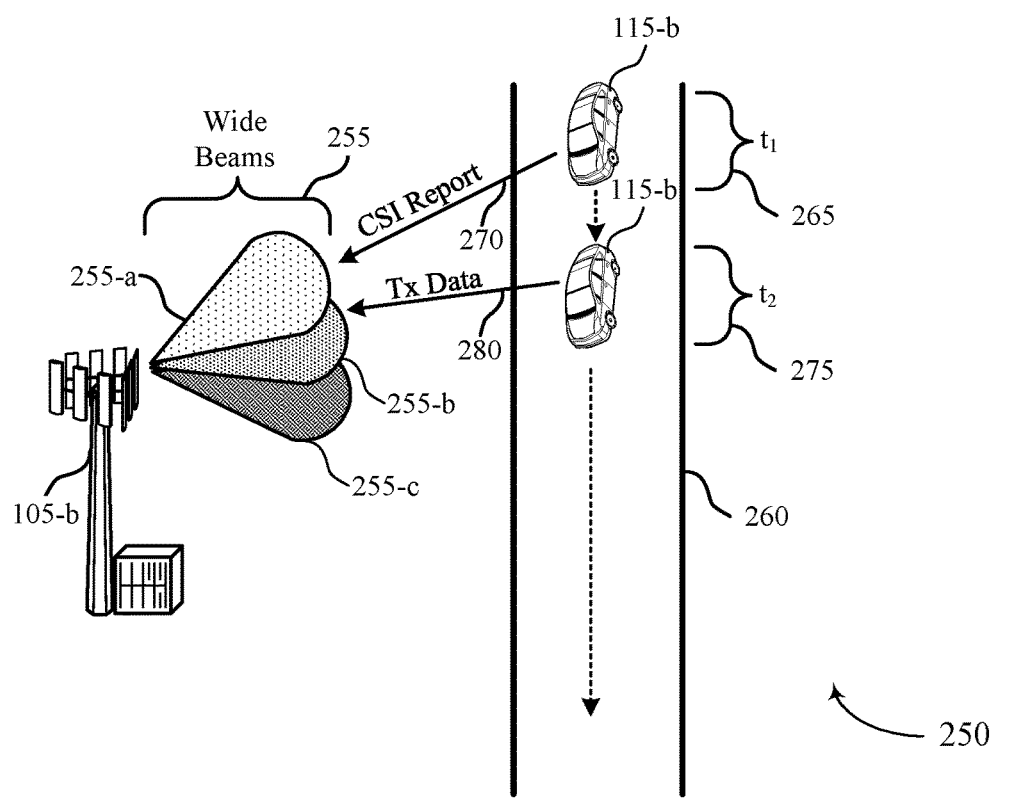

FIGS. 2A and 2B illustrate examples of wireless communications systems 200 and 250 that support channel state information reporting techniques for wide beams in accordance with aspects of the present disclosure. In some examples, wireless communications system 200 may implement aspects of wireless communications system 100. For example, the wireless communications system 200 may include a UE 115-a and a base station 105-a, which may be examples of the corresponding devices described with reference to FIG. 1. Likewise, wireless communications system 250 may include a UE 115-b and a base station 105-b, which may be examples of the corresponding devices described with reference to FIGS. 1 and 2A.

The devices of the wireless communications system 200 may support beamforming to enhance reliability and efficiency using directional signal transmission. In the example of FIG. 2A, the base station 105-a may use one or more narrow beams 205 for communications with UE 115-a. In this example, UE 115-a may be a vehicle that is traveling along a roadway 210. At a first time ($t_1$) 215, the UE 115-a in this example may transmit a CSI report 220. The CSI report 215 may identify a first narrow beam 205-a, which may be determined based on measurements of a CSI-RS that is transmitted using the first narrow beam 205-a. Subsequent to the CSI report 215, at a second time (t2) 225, the UE 115-a may transmit data 230 to the base station 105-a (e.g., physical uplink shared channel (PUSCH) data). However, due to the mobility of the UE 115-a, the data 230 transmission using parameters associated with the first narrow beam 205-a may have degraded, thus reducing the likelihood of the base station 105-a successfully receiving the uplink data 230 transmission.

In some cases, in order to enhance the likelihood of successful communications in cases where UE 115 mobility is relatively high, wide beams may be used, such as illustrated in FIG. 2B. In this example, UE 115-b again may be a vehicle that is traveling along a roadway 260. At a first time ($t_1$) 265, the UE 115-b in this example may transmit a CSI report 270. The CSI report 270 may identify a first wide beam 255-a, which may be determined based on measurements of a CSI-RS that is transmitted using one or more narrow beam (e.g., beams 205 of FIG. 2A). Subsequent to the CSI report 270, at a second time (t2) 275, the UE 115-b may transmit data 280 to the base station 105-b (e.g., physical uplink shared channel (PUSCH) data). Due to the mobility of the UE 115-b, the data 280 transmission using parameters associated with the first wide beam 255-a may provide enhanced channel quality than for a narrow beam (e.g., first narrow beam 205-a of FIG. 2A), thus enhancing the likelihood of the base station 105-a successfully receiving the uplink data 280 transmission.

In some cases, when a UE provides a CSI report that provides a narrow beam indication, the beam indication(s) may be provided by a PMI report. In some current deployments, the PMI report may be based on narrow beams (e.g., the reported codewords in PMI represent a number of narrow beams (type-1 codebook) or a linear weighted sum (w) of narrow beams (type-2 codebook)). The more antenna elements ($N_1$, $N_2$) are used for beamforming, the narrower is the generated beam (where $N_1$ and $N_2$ are the numbers of rows and columns of antenna elements in an antenna panel). The form of beam weight by type-1 codebook may be that a beam is composed of a horizontal beam component and a vertical beam component. Further, oversampling factors ($O_1$ and $O_2$) for vertical beam direction and horizontal beam direction. The horizontal beam component may be determined according to:

$$u_m = \begin{cases} \begin{bmatrix} 1 & e^{j\frac{2\pi m}{O_2 N_2}} & \cdots & e^{j\frac{2\pi m(N_2-1)}{O_2 N_2}} \end{bmatrix} & N_2 > 1 \\ 1 & N_2 = 1 \end{cases}$$

The vertical beam component may be determined according to:

$$v_{l,m} = \begin{bmatrix} u_m & e^{j\frac{2\pi l}{O_1 N_1}} u_m & \cdots & e^{j\frac{2\pi l(N_1-1)}{O_1 N_1}} u_m \end{bmatrix}^T$$

The form of beam weight by type-2 codebook, in such cases, may be:

$$W^l_{q_1,q_2,n_1,n_2,p_l^{(1)},p_l^{(2)},c_l} = \frac{1}{\sqrt{N_1 N_2 \sum_{i=0}^{2L-1}(p_{l,i}^{(1)} p_{l,i}^{(2)})^2}} \begin{bmatrix} \sum_{i=0}^{L-1} v_{m_1^{(i)},m_2^{(i)}} p_{l,i}^{(1)} p_{l,i}^{(2)} \varphi_{l,i} \\ \sum_{i=0}^{L-1} v_{m_1^{(i)},m_2^{(i)}} p_{l,i+L}^{(1)} p_{l,i+L}^{(2)} \varphi_{l,i+L} \end{bmatrix}, l = 1, 2,$$

If the beam direction is accurate, such narrow beams can provide relatively large beamforming gain.

As discussed, in cases where narrow beams 205 may result in relatively fast channel quality degradation due to mobility of the UE 115, beam broadening may be performed. As discussed, wider beams may be preferred in various scenarios, such as when the radio channel of a UE 115 has fast time variance (e.g., the Doppler frequency is high due to high speed movement), and a narrow beam from the base station 105 does not easily capture the UE 115 position. This may cause the reported beam a certain number of slots ahead to have a relatively large deviation with the actual beam when the data is transferred (e.g., in transmission of data 230). In some cases, such as in the example of FIG. 2B, the base station 105-b may generate a wide beam 255 to cover the UE 115-b possible positions (e.g., based on a PMI indication of a number of suitable beams from the UE 115-b, which may be used by the base station 105-b to determine a wide beam 255). Though the peak beamforming gain of a wide beam 255 may be lower than that of a narrow beam 205, where the peak beamforming gain is obtained by accurately pointing the UE 115, the wide beam 255 may be more robust to the beam direction change than the narrow beam 205. This increases the data transfer success rate and thus the overall throughput of data transfer in such fast time-variant radio channels. Traditional techniques for beam broadening may provide that if the base station 105-b knows the UE 115-b spatial position (not necessarily with high precision), it can control the wide beam to cover that position.

Such spatial position may be obtained with relative accuracy in TDD systems where a base station 105 can derive the beam direction from a sounding reference signal (SRS) transmitted by a UE 115, based on DL-UL reciprocity. However, in FDD systems without DL-UL reciprocity or in TDD systems where the DL-UL reciprocity is broken, the base station 105 may not know the UE 115 spatial position based on uplink reception. In such FDD cases, the base station 105 may configure the UE 115 to report PMI to indicate the beam directions, which are obtained by downlink reception of reference signals (e.g., CSI-RS). However, current codebooks based on narrow beams may not fit to wide beam indication. Due to UE 115 movement, the optimal beam directions may not be distributed individually, and instead they are distributed with a number of clusters. In such cases, if the UE 115 follows the traditional PMI report based on narrow beams (e.g., report all the narrow beams that constitute the wide beam), the quantity of reported beams is large, and thus substantially increases the PMI report payload, and thereby would decrease the spectrum efficiency and the cell coverage. Further, in such cases where the UE 115 reports a number of adjacent narrow beams to represent a wide beam, the actual beam used as the wide beam used by the base station 105 is still unknown to the UE 115. In such cases, the base station 105 may then determine a wide beam precoding matrix based on the received report and transmit a reference signal via the determined wide beam. Based on this reference signal, the UE 115 may reports CQI/PMI/RI. This procedure requires two steps of UE 115 reporting, and thus may result in longer latency and more signaling overhead.

In accordance with techniques as discussed herein, a UE 115 may report wide beam parameters directly to a base station 105. In some cases, a base station 105 may configure a UE 115 to report the preferred wide beam parameters including the beam direction and the beam width as follows. In some cases, the beam direction may be an angle value θ whose corresponding beam has the highest beamforming gain based on UE 115 measurements of reference signals transmitted using different beams. The beam direction may be represented by an angle value. The beam width may be represented as a multiple (e.g., by x times) of the beam width of the narrow beam which is generated by the same transmit antennas and has the same direction. In some cases, the UE 115 may report the vertical beam direction $\theta_v$, vertical beam width $x_v$, horizontal beam direction $\theta_h$, and horizontal beam width $x_h$ for each of a number of layers, as well as the CQI/PMI/RI values associated with these values. Based on such a set of wide beam parameters, the base station 105 may communicate with the UE 115 using the wide beam precoding (e.g., PDCCH/PDSCH communications).

Figure 3:
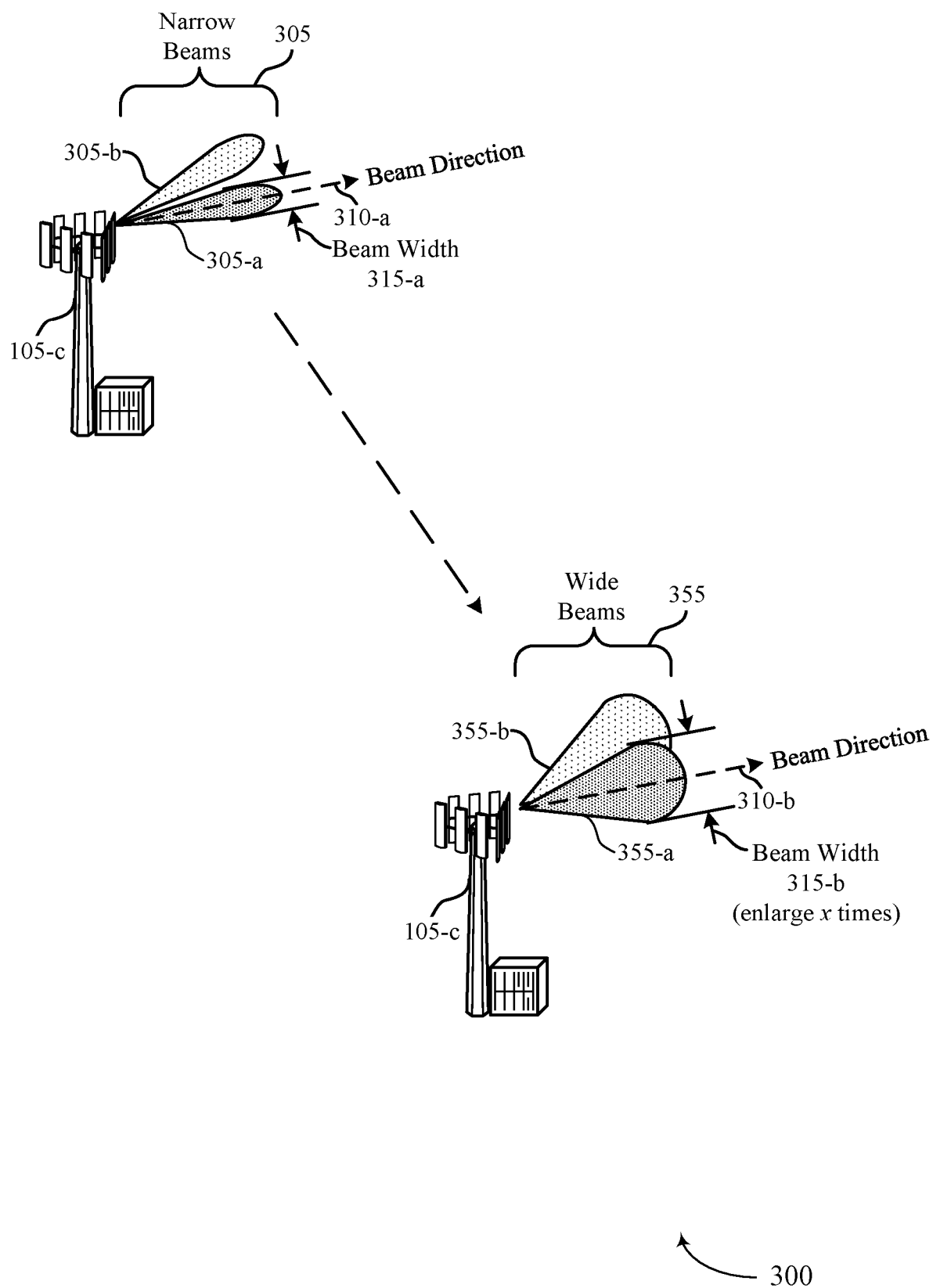
FIG. 3 illustrates an example of a wireless communications system with wide beams that supports channel state information reporting techniques for wide beams in accordance with aspects of the present disclosure.

FIG. 3 illustrates an example of a wireless communications system with wide beams 300 that supports channel state information reporting techniques for wide beams in accordance with aspects of the present disclosure. In some examples, wireless communications system with wide beams 300 may implement aspects of wireless communications system 100, 200, or 250. In this example, a base station 105-c may transmit one or more reference signals (e.g., CSI-RS) using multiple narrow beams 305, including a first narrow beam 305-a and a second narrow beam 305-b. In this example, the first narrow beam 305-a may have an associated first narrow beam direction 310-a and first narrow beam width 315-a.

Figure 4:
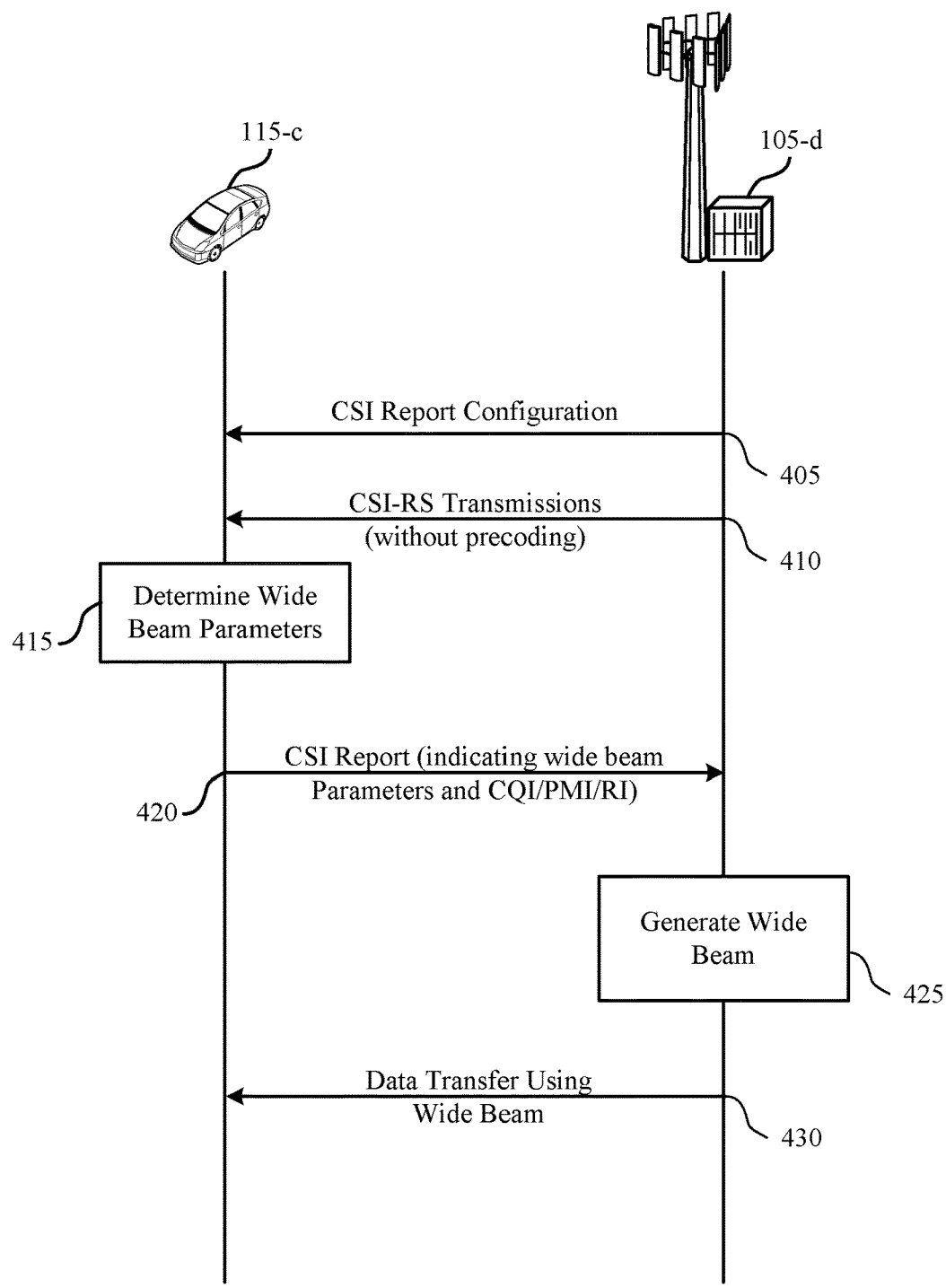
FIG. 4 illustrates an example of a process flow that supports channel state information reporting techniques for wide beams in accordance with aspects of the present disclosure.

In some cases, the first narrow beam 305-a may be identified based on a PMI report, that represents a narrow beam with the beam direction from type-1 codebook or type-2 codebook. In this example, wide beams 355 may be generates based on an enhanced PMI report, that represents a wide beam with the beam direction plus the beam width value. In the example of FIG. 3, a first wide beam 355-a may have a first wide beam direction 310-b, that may correspond to the first narrow beam direction 310-a, and may have a first wide beam width 315 that may be a multiple of the first narrow beam width 315-a (e.g., the first narrow beam width 315-a is enlarged by x times to generate the first wide beam width 315-b). FIG. 4 illustrates a process flow for determination of the set if wide beam parameters in accordance with various aspects of the present disclosure.

FIG. 4 illustrates an example of a process flow 400 that supports channel state information reporting techniques for wide beams in accordance with aspects of the present disclosure. In some examples, process flow 400 may implement aspects of wireless communications system 100, 200, 250, or 300. The process flow 400 may include a base station 105-d and a UE 115-c, which may be examples of the corresponding devices of FIGS. 1 through 3.

At 405, the base station 105-d may transmit a CSI report configuration to the UE 115-c. In some cases, the CSI report configuration may indicate that the UE 115-c is to report wide beam parameters in a CSI report. In some cases, the base station 105-d may determine that a wide beam CSI report is to be transmitted by the UE 115-c based on an indication received from the UE 115-c, based on narrow beam changes associated with the UE 115-c, and the like. In some cases, the CSI report configuration may indicate that the UE 115-c may determine whether to report wide beam parameters or narrow beam parameters, and the UE 115-c may select which parameters to report based on current conditions, and a measurement report from the UE 115-c (e.g., a CSI report) may indicate whether the report is for narrow beam parameters or wide beam parameters. In some cases, the UE 115-c may use multiple spatial layers (e.g., that are indicated in a RI), and different layers may use wide beams or narrow beams. Additionally or alternatively, different frequency sub-bands may use wide beams or narrow beams. In some cases, the base station may request UE 115-c to report a number of beam directions and a respective beam width for each beam direction. Such values may be for each layer respectively, and they can be wideband or per sub-band. The CSI report configuration may be provided via RRC signaling, via a MAC CE, via DCI, or any combinations thereof.

At 410, the base station 105-d may transmit a CSI-RS to the UE 115-c. The CSI-RS may be transmitted without precoding, and the UE 115-c may measure beamforming gains associated with the CSI-RS based on different UE 115-c narrow beams to identify a first narrow beam with a highest beamforming gain or with an acceptable beamforming gain (e.g., a gain above a threshold value).

At 415, the UE 115-c may determine wide beam parameters based on the measurements of the CSI-RS. In some cases, the UE 115-c may determine the wide beam parameters based on the identified first narrow beam. In some cases, as discussed herein, the wide beam parameters may include a beam direction (e.g., vertical and horizontal beam directions) that corresponds to the first narrow beam direction. Further, the wide beam parameters may include a beam width (e.g., vertical and horizontal beam widths), that is determined based on a multiple of the first narrow beam width.

At 420, the UE 115-c may transmit a CSI report to the base station 105-d. The CSI report may include the set of wide beam parameters. In some cases, the CSI report may include CQI, PMI, RI, or any combinations thereof. In some cases, the CSI report may provide parameters for a single-layer. In such cases, if $N_1$ and $N_2$ are the numbers of rows or columns of antenna elements in an antenna panel, and $O_1$ and $O_2$ are the oversampling factors for vertical beam direction or horizontal beam direction (e.g., that are configured at the UE 115-c), then UE 115-c may quantize the wide beam wideband parameters of one layer as follows:

$$\theta_v \text{ is quantized as } \frac{2\pi i_1}{O_1 N_1}, i_1 = 0, 1, \ldots, O_1 N_1 - 1;$$

$$\theta_h \text{ is quantized as } \frac{2\pi i_2}{O_2 N_2}, i_2 = 0, 1, \ldots, O_2 N_2 - 1;$$

$x_v$ is quantized as $2^{i_3}$, $i_3=0, 1, \ldots, M_v-1$, where $M_v$ is the upper bound of the beam broadening in vertical direction; and $x_h$ is quantized as $2^{i_4}$, $i_4=0, 1, \ldots, M_h-1$, where $M_h$ is the upper bound of the beam broadening in horizontal direction.

Based on these quantization results, the UE 115-c may report the wide beam parameters with a number of bits as: $\lceil \log_2 O_1 N_1 \rceil$ bits, which represent the quantized $\theta_v$ value; $\lceil \log_2 O_2 N_2 \rceil$ bits, which represent the quantized $\theta_h$ value; $\lceil \log_2 M_v \rceil$ bits, which represent the quantized $x_v$ value; and $\lceil \log_2 M_h \rceil$ bits, which represent the quantized $x_h$ value.

For multi-layer CSI, the UE 115-c may report wide beams wideband parameters for multiple layers, where each layer 1 has its own beam direction values $(\theta_v, \theta_h)$ and beam width values $x_v$ and $x_h$, which are quantized by the indexes $i_{1,l}$, $i_{2,l}$, $i_{3,l}$ and $i_{4,l}$, and are represented by a number of bits in a same manner as the single layer report, where $1 \leq l \leq L$, and L is the number of layers.

In some cases, the base station 105-d may also configure the UE 115-c to report multiple sets of wide beam parameters for a number of sub-bands respectively. In some cases, the UE 115-c may report the indexes $i_{1,l,k}$, $i_{2,l,k}$, $i_{3,l,k}$ and $i_{4,l,k}$ for each sub-band k of layer l individually, using the representation bits as discussed for the wideband case, where $1 \leq k \leq K$, and K is the number of subbands. In other cases, considering the similarity of beam direction and beam width between adjacent sub-bands, the UE 115-c may report a set of wideband values and a set of differential values for each sub-band. In such cases, the wideband wide beam values may be $\{\theta_{v,l}, \theta_{h,l}, x_{v,l}, x_{h,l}\}$, which are quantized by indexes $\{i_{1,l}, i_{2,l}, i_{3,l}, i_{4,l}\}$ for layer l. The differential sub-band wide beam values may be $\{\tilde{\theta}_{v,l,k}, \tilde{\theta}_{h,l,k}, \tilde{x}_{v,l,k}, \tilde{x}_{h,l,k}\}$, which means the wide beam values for subband k are $\{\theta_{v,l}+\tilde{\theta}_{v,l,k}, \theta_{h,l}+\tilde{\theta}_{h,l,k}, x_{v,l} \cdot \tilde{x}_{v,l,k}, x_{h,l} \cdot \tilde{x}_{h,l,k}\}$. The differential values for subband k of layer l can be quantized as follows:

$$\tilde{\theta}_{v,l,k} \text{ is quantized as } \frac{2\pi \tilde{i}_{1,l,k}}{O_1 N_1}, i_{1,l,k} = 0, 1, \ldots,$$

$M_1 - 1 < O_1 N_1 - 1$, represented by $\lceil \log_2 M_1 \rceil$ bits;

$$\tilde{\theta}_{h,l,k} \text{ is quantized as } \frac{2\pi \tilde{i}_{2,l,k}}{O_2 N_2}, i_{2,l,k} = 0, 1, \ldots,$$

$M_2 - 1 < O_2 N_2 - 1$, represented by $\lceil \log_2 M_2 \rceil$ bits;

$\tilde{x}_{v,l,k}$ is quantized as $2^{\tilde{i}_{3,l,k}}$, $i_{3,l,k}=0, 1, \ldots, M_3-1 < M_v-1$, represented by $\lceil \log_2 M_3 \rceil$ bits; and $\tilde{x}_{h,l,k}$ is quantized as $2^{\tilde{i}_{4,l,k}}$, $i_{4,l,k}=0, 1, \ldots, M_4-1 < M_h-1$, represented by $\lceil \log_2 M_4 \rceil$ bits.

In such cases, because the possible quantization values of differential wide beam values are less than the possible quantization values of original wide beam values, the number of consumed bits is decreased. In some cases, reporting differential values for any of $\{\theta_v, \theta_h, x_v, X_h\}$ may be independent, and the base station 105-d may configure any one or more of them to adopt differential values, while configuring others to adopt independent values. Further, reporting differential values may also be layer-specific, where some layers can adopt differential values, while the others adopt independent values. The less frequency-domain fluctuates, the more preferred it may be to use differential values, and in some cases differential values may be reported in cases where frequency domain fluctuation (e.g., based on a Doppler shift value) is less than a threshold.

In some cases, the UE 115-c may report mixed narrow beam and wide beam parameters. In some cases, the base station 105-d may configure the UE 115-c to report wide beam in a first subset of layers and narrow beams in a second subset of layers that is non-overlapping with the first subset of layers. In other cases, the UE 115-c may determine whether to report wide beam or narrow beam parameters. In such cases, the UE 115-c may add a flag to indicate the beam type (wide or narrow) for each layer in the CSI report.

The CSI report may also include one or more parameters for CQI, PMI, RI, or any combinations thereof. In some cases, reporting of CQI/PMI/RI may be provided by the UE 115-c. In some cases, the base station 105-d may configure a wide beam codebook with the beam direction θ and beam width x as parameters. Then, given $\{\theta_v, \theta_h, x_v, x_h\}$, a precoding vector for layer l can be generated by both the base station 105-d and UE 115-c, denoted as $w_l$. When the UE 115-c determines the wide beam precoding matrix is $[w_1, w_2, \ldots, w_L]$, it can report the wide beam values as PMI and the value of L as RI. Then, UE 115-c may determine and report one or multiple CQI values based on PMI and RI. In some cases, when using a wide beam codebook the UE 115-c may report the beam width value $x_i$ and beam direction $\theta_i$, and the UE 115-c and base station 105-d may follow the same wide beam generation method, such as by dividing UE 115-c antennas into $x_i$ subgroups, generating weights for each subgroup to generate a weight vector for the UE 115-c antennas. The weight vector may then be reported to the base station 105-d, which may then determine the wide beam parameters.

At 425, the base station 105-d may generate a wide beam for communications with the UE 115-c. In some cases, the wide beam is generated based on the set of wide beam parameters provided in the CSI report. In some cases, the base station 105-d determines one or more layers, sub-bands, or combinations thereof, that are to use wide beams or narrow beams based on the CSI report. At 430, the base station 105-d may transmit data to the UE 115-c using the generated wide beam.

Figure 5:
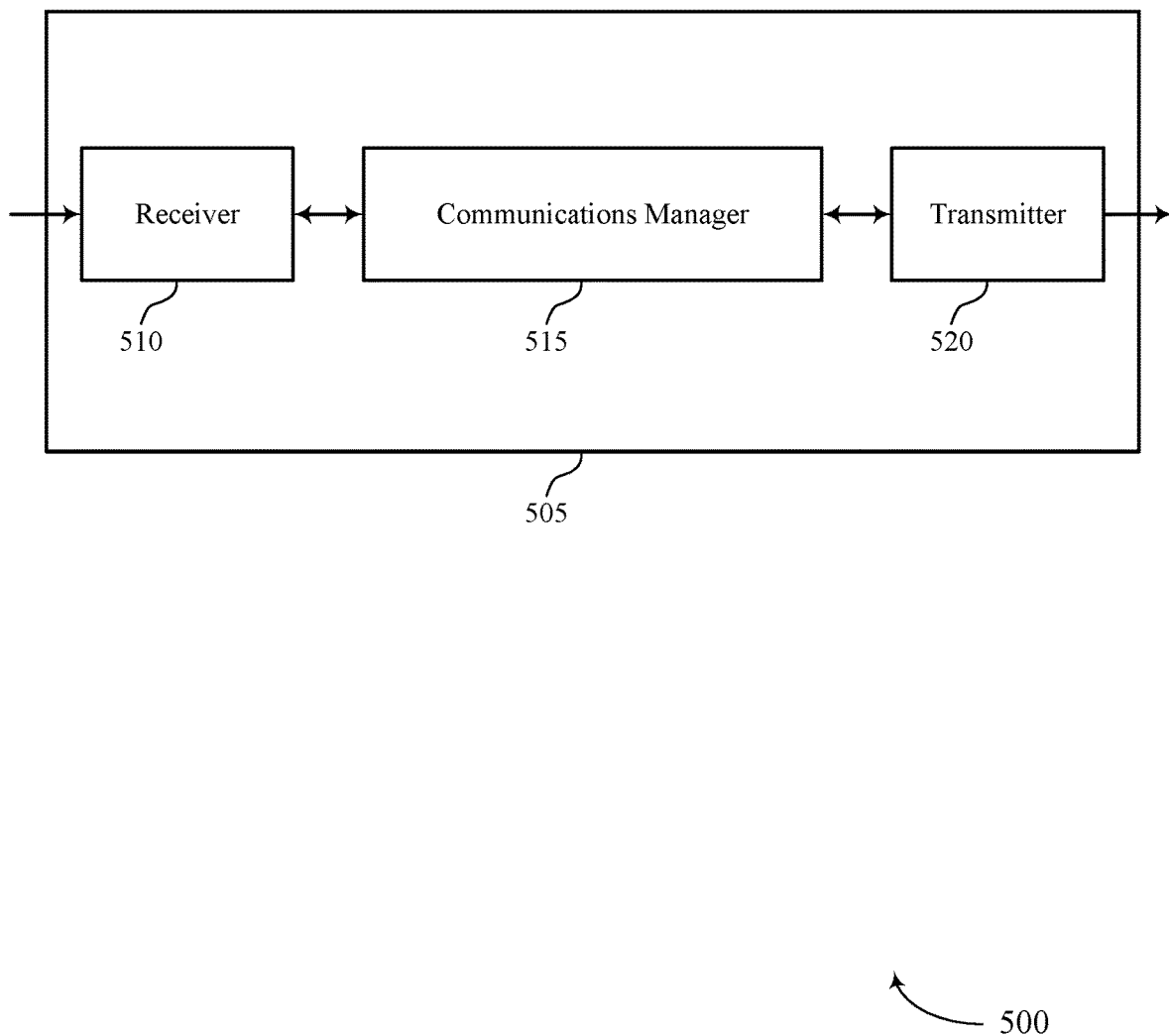
FIGS. 5 and 6 show block diagrams of devices that support channel state information reporting techniques for wide beams in accordance with aspects of the present disclosure.

FIG. 5 shows a block diagram 500 of a device 505 that supports channel state information reporting techniques for wide beams in accordance with aspects of the present disclosure. The device 505 may be an example of aspects of a UE 115 as described herein. The device 505 may include a receiver 510, a communications manager 515, and a transmitter 520. The device 505 may also include a processor. Each of these components may be in communication with one another (e.g., via one or more buses).

The receiver 510 may receive information such as packets, user data, or control information associated with various information channels (e.g., control channels, data channels, and information related to channel state information reporting techniques for wide beams, etc.). Information may be passed on to other components of the device 505. The receiver 510 may be an example of aspects of the transceiver 820 described with reference to FIG. 8. The receiver 510 may utilize a single antenna or a set of antennas.

The communications manager 515 may measure a reference signal from a base station using two or more beamforming parameters for two or more antennas to identify at least a first narrow beam with a beamforming gain that exceeds beamforming gains of one or more other narrow beams, where the first narrow beam has a first beam direction and a first beam width, determine a second beam direction and a second beam width for a first wide beam, where the second beam direction is based on the first beam direction and the second beam width is a multiple of the first beam width, and transmit a set of wide beam parameters to the base station that indicate the second beam direction and the second beam width of the first wide beam. The communications manager 515 may be an example of aspects of the communications manager 810 described herein.

The communications manager 515 as described herein may be implemented to realize one or more potential advantages. One implementation may allow the device 505 to more efficiently determine and communicate wide beam parameters, which may provide for more efficient communications in a high mobility scenario. Using wide beams for such communications may support improvements in the beamforming communication framework, decrease signaling overhead, and improve reliability, among other advantages. As such, supported techniques may include improved network operations and, in some examples, may promote network efficiencies, among other benefits.

The communications manager 515, or its sub-components, may be implemented in hardware, code (e.g., software or firmware) executed by a processor, or any combination thereof. If implemented in code executed by a processor, the functions of the communications manager 515, or its sub-components may be executed by a general-purpose processor, a DSP, an application-specific integrated circuit (ASIC), a FPGA or other programmable logic device, discrete gate or transistor logic, discrete hardware components, or any combination thereof designed to perform the functions described in the present disclosure.

The communications manager 515, or its sub-components, may be physically located at various positions, including being distributed such that portions of functions are implemented at different physical locations by one or more physical components. In some examples, the communications manager 515, or its sub-components, may be a separate and distinct component in accordance with various aspects of the present disclosure. In some examples, the communications manager 515, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 520 may transmit signals generated by other components of the device 505. In some examples, the transmitter 520 may be collocated with a receiver 510 in a transceiver module. For example, the transmitter 520 may be an example of aspects of the transceiver 820 described with reference to FIG. 8. The transmitter 520 may utilize a single antenna or a set of antennas.

Figure 6:
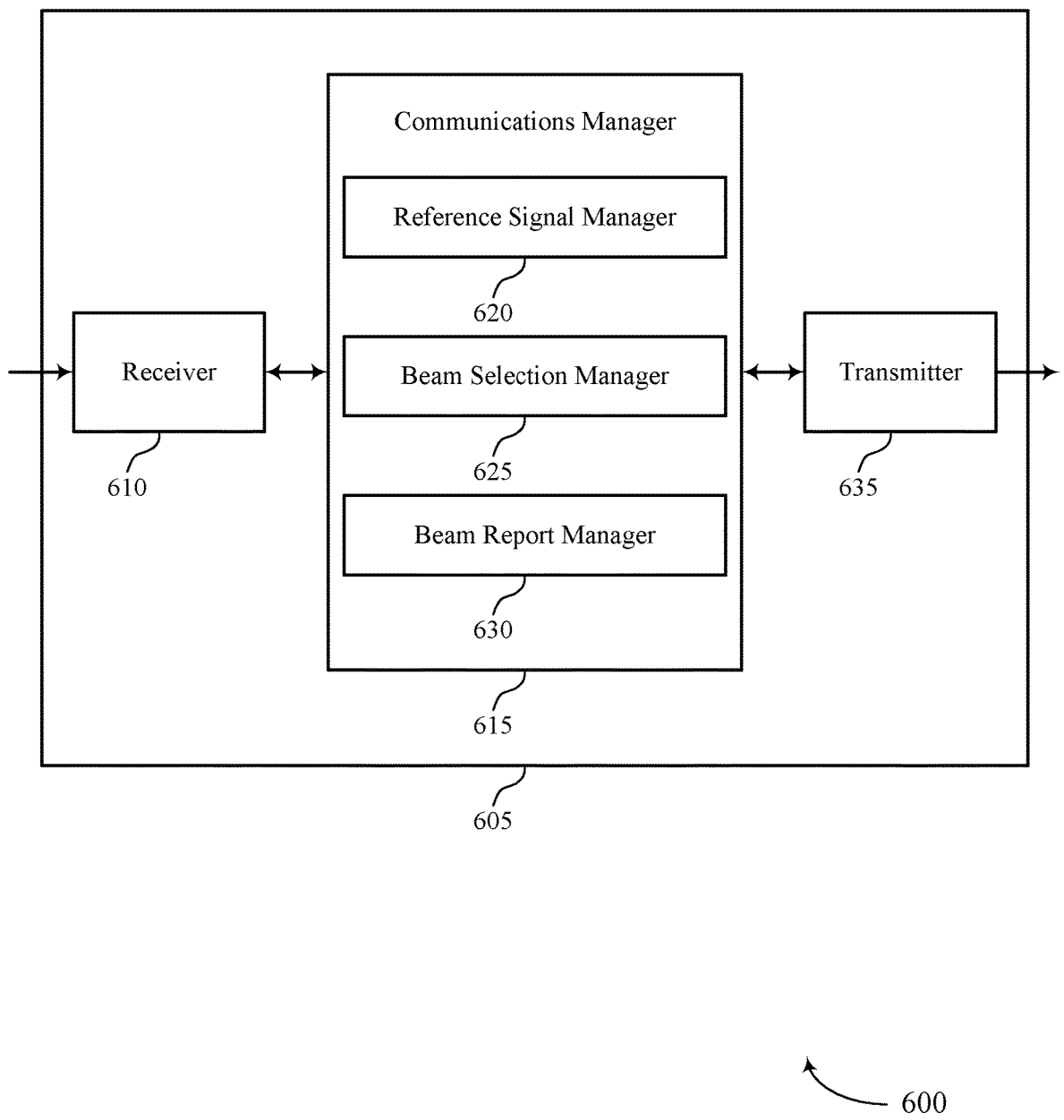

FIG. 6 shows a block diagram 600 of a device 605 that supports channel state information reporting techniques for wide beams in accordance with aspects of the present disclosure. The device 605 may be an example of aspects of a device 505, or a UE 115 as described herein. The device 605 may include a receiver 610, a communications manager 615, and a transmitter 635. The device 605 may also include a processor. Each of these components may be in communication with one another (e.g., via one or more buses).

The receiver 610 may receive information such as packets, user data, or control information associated with various information channels (e.g., control channels, data channels, and information related to channel state information reporting techniques for wide beams, etc.). Information may be passed on to other components of the device 605. The receiver 610 may be an example of aspects of the transceiver 820 described with reference to FIG. 8. The receiver 610 may utilize a single antenna or a set of antennas.

The communications manager 615 may be an example of aspects of the communications manager 515 as described herein. The communications manager 615 may include a reference signal manager 620, a beam selection manager 625, and a beam report manager 630. The communications manager 615 may be an example of aspects of the communications manager 810 described herein.

The reference signal manager 620 may measure a reference signal from a base station using two or more beamforming parameters for two or more antennas to identify at least a first narrow beam with a beamforming gain that exceeds beamforming gains of one or more other narrow beams, where the first narrow beam has a first beam direction and a first beam width.

The beam selection manager 625 may determine a second beam direction and a second beam width for a first wide beam, where the second beam direction is based on the first beam direction and the second beam width is a multiple of the first beam width.

The beam report manager 630 may transmit a set of wide beam parameters to the base station that indicate the second beam direction and the second beam width of the first wide beam.

The transmitter 635 may transmit signals generated by other components of the device 605. In some examples, the transmitter 635 may be collocated with a receiver 610 in a transceiver module. For example, the transmitter 635 may be an example of aspects of the transceiver 820 described with reference to FIG. 8. The transmitter 635 may utilize a single antenna or a set of antennas.

Figure 7:
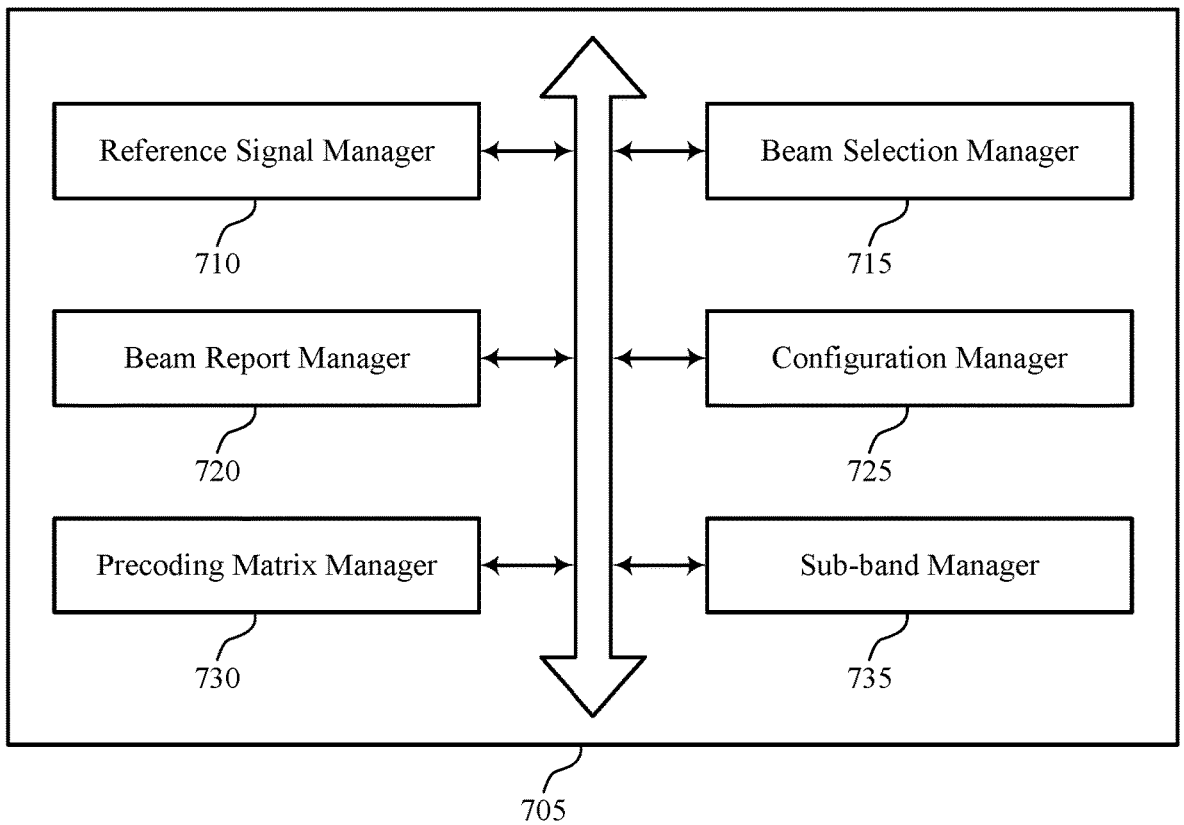
FIG. 7 shows a block diagram of a communications manager that supports channel state information reporting techniques for wide beams in accordance with aspects of the present disclosure.

FIG. 7 shows a block diagram 700 of a communications manager 705 that supports channel state information reporting techniques for wide beams in accordance with aspects of the present disclosure. The communications manager 705 may be an example of aspects of a communications manager 515, a communications manager 615, or a communications manager 810 described herein. The communications manager 705 may include a reference signal manager 710, a beam selection manager 715, a beam report manager 720, a configuration manager 725, a precoding matrix manager 730, and a sub-band manager 735. Each of these modules may communicate, directly or indirectly, with one another (e.g., via one or more buses).

The reference signal manager 710 may measure a reference signal from a base station using two or more beamforming parameters for two or more antennas to identify at least a first narrow beam with a beamforming gain that exceeds beamforming gains of one or more other narrow beams, where the first narrow beam has a first beam direction and a first beam width. In some cases, the reference signal is a channel state information reference signal (CSI-RS) that is transmitted without precoding.

The beam selection manager 715 may determine a second beam direction and a second beam width for a first wide beam, where the second beam direction is based on the first beam direction and the second beam width is a multiple of the first beam width. In some examples, the beam selection manager 715 may select at least a first transmission layer for wide beam communications and at least a second transmission layer for narrow beam communications, and where the set of wide beam parameters includes an indication that identifies an associated transmission layer as being selected for wide beam communications.

The beam report manager 720 may transmit a set of wide beam parameters to the base station that indicate the second beam direction and the second beam width of the first wide beam. In some examples, the beam report manager 720 may transmit a CSI report that indicates a vertical beam direction, a vertical beam width, a horizontal beam direction, and a horizontal beam width of the first wide beam. In some examples, the beam report manager 720 may transmit the set of wide beam parameters for each of two or more transmission layers. In some examples, the beam report manager 720 may transmit one or more of a channel quality indicator value, a precoding matrix index value, a rank index value, or combinations thereof, that are associated with the set of wide beam parameters. In some examples, the beam report manager 720 may transmit the set of wide beam parameters for a first subset of transmission layers, and transmitting one or more precoding codebook values for narrow beams for a second subset of transmission layers.

In some cases, the wide beam parameter report is provided in a CSI report that includes values for the second beam direction and the second beam width. In some cases, the second beam direction is an angle value of the first narrow beam that has a largest beamforming gain of the one or more other narrow beams, and is represented by an angle value in the CSI report. In some cases, the second beam width is represented by the multiple of the first beam width that is generated by transmit antennas of the first narrow beam at the first beam direction. In some cases, the set of wide beam parameters are transmitted to the base station in an enhanced precoding matrix indicator (PMI) report. In some cases, the set of wide beam parameters are determined and reported for two or more transmission layers, for two or more communication bandwidths, for two or more sub-bands of a set of sub-bands, or any combinations thereof. In some cases, the set of wide beam parameters include values for vertical beam direction and horizontal beam direction that are quantized based on a number of antenna elements at the UE, oversampling factors for vertical or horizontal beam directions, or any combinations thereof. In some cases, the set of wide beam parameters include values for vertical beam width and horizontal beam width that are quantized based on upper bounds for beam broadening for the vertical or horizontal beam directions, or any combinations thereof. In some cases, the set of wide beam parameters include separate horizontal and vertical beam direction values, and separate horizontal and vertical width values, for each of two or more transmission layers. In some cases, the set of wide beam parameters include a set of indices for a wide band of each transmission layer.

The configuration manager 725 may receive, from the base station, configuration information for the reference signal and a wide beam parameter report for providing the set of wide beam parameters. In some examples, the configuration manager 725 may receive, from the base station, configuration information via RRC signaling, a MAC-CE, DCI, or any combinations thereof, where the configuration information provides a CSI report configuration for determining the second beam direction and the second beam width, and for transmitting the set of wide beam parameters to the base station.

The precoding matrix manager 730 may receive one or more downlink communications from the base station using a wide beam precoding matrix that is determined based on the set of wide beam parameters. In some examples, the precoding matrix manager 730 may determine a wide beam codebook index value associated with the second beam direction and the multiple that provides the second beam width. In some examples, the precoding matrix manager 730 may transmit the wide beam codebook index value to the base station to indicate the wide beam parameters.

In some examples, the precoding matrix manager 730 may determine, based on the second beam direction and the second beam width, a wide beam precoding matrix. In some examples, the precoding matrix manager 730 may transmit a PMI associated with the wide beam precoding matrix and a RI value that indicates an associated transmission layer. In some examples, the precoding matrix manager 730 may determine one or more CQI values associated with the reference signal. In some examples, the precoding matrix manager 730 may provide the one or more CQI values based on the PMI and the RI. In some cases, the second beam direction and the second beam width are determined based on a type-1 precoding codebook or a type-two precoding codebook that are configured by the base station. In some cases, a precoding vector for communications with the base station is determined based on the wide beam codebook index value.

The sub-band manager 735 may manage beam parameters based on one or multiple configured sub-bands. In some cases, the set of wide beam parameters include separate horizontal and vertical beam direction values, and separate horizontal and vertical width values, for each of two or more sub-bands. In some cases, the set of wide beam parameters include a set of indices for each of the two or more sub-bands and each transmission layer. In some cases, the set of wide beam parameters for each sub-band are reported as differential values relative to values of the wide band. In some cases, the set of wide beam parameters for a first subset of sub-bands are reported as differential values relative to values of a wide band, and the set of wide beam parameters for a second subset of sub-bands are reported as actual values of the wide beam parameters.

Figure 8:
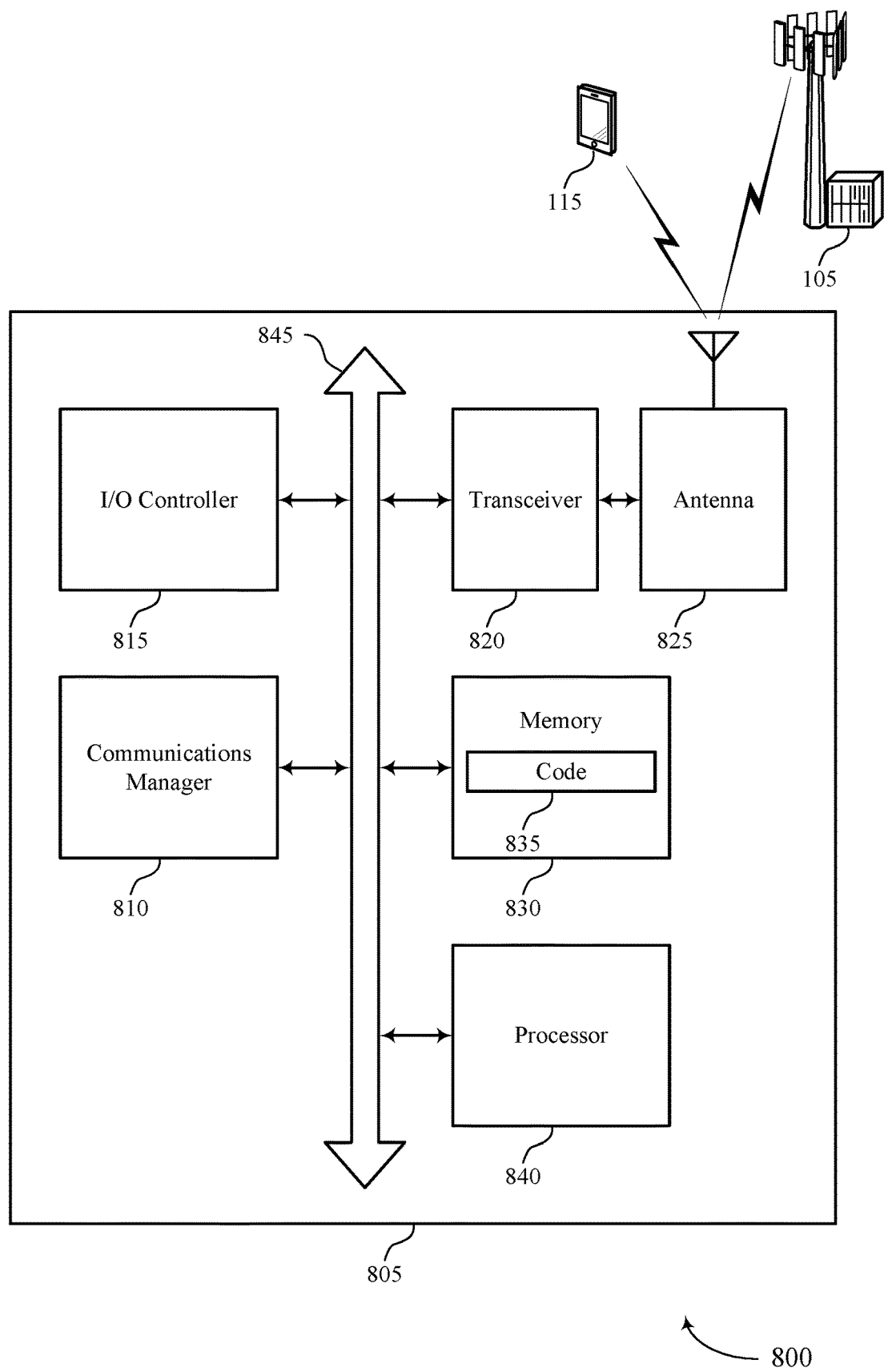
FIG. 8 shows a diagram of a system including a device that supports channel state information reporting techniques for wide beams in accordance with aspects of the present disclosure.

FIG. 8 shows a diagram of a system 800 including a device 805 that supports channel state information reporting techniques for wide beams in accordance with aspects of the present disclosure. The device 805 may be an example of or include the components of device 505, device 605, or a UE 115 as described herein. The device 805 may include components for bi-directional voice and data communications including components for transmitting and receiving communications, including a communications manager 810, an I/O controller 815, a transceiver 820, an antenna 825, memory 830, and a processor 840. These components may be in electronic communication via one or more buses (e.g., bus 845).

The communications manager 810 may measure a reference signal from a base station using two or more beamforming parameters for two or more antennas to identify at least a first narrow beam with a beamforming gain that exceeds beamforming gains of one or more other narrow beams, where the first narrow beam has a first beam direction and a first beam width, determine a second beam direction and a second beam width for a first wide beam, where the second beam direction is based on the first beam direction and the second beam width is a multiple of the first beam width, and transmit a set of wide beam parameters to the base station that indicate the second beam direction and the second beam width of the first wide beam.

The communications manager 810 as described herein may be implemented to realize one or more potential advantages. One implementation may allow the device 805 to more efficiently determine and communicate wide beam parameters, which may provide for more efficient communications in a high mobility scenario. Using wide beams for such communications may support improvements in the beamforming communication framework, decrease signaling overhead, and improve reliability, among other advantages. As such, supported techniques may include improved network operations and, in some examples, may promote network efficiencies, among other benefits.

The I/O controller 815 may manage input and output signals for the device 805. The I/O controller 815 may also manage peripherals not integrated into the device 805. In some cases, the I/O controller 815 may represent a physical connection or port to an external peripheral. In some cases, the I/O controller 815 may utilize an operating system such as iOS®, ANDROID®, MS-DOS®, MS-WINDOWS®, OS/2®, UNIX®, LINUX®, or another known operating system. In other cases, the I/O controller 815 may represent or interact with a modem, a keyboard, a mouse, a touchscreen, or a similar device. In some cases, the I/O controller 815 may be implemented as part of a processor. In some cases, a user may interact with the device 805 via the I/O controller 815 or via hardware components controlled by the I/O controller 815.

The transceiver 820 may communicate bi-directionally, via one or more antennas, wired, or wireless links as described above. For example, the transceiver 820 may represent a wireless transceiver and may communicate bi-directionally with another wireless transceiver. The transceiver 820 may also include a modem to modulate the packets and provide the modulated packets to the antennas for transmission, and to demodulate packets received from the antennas.

In some cases, the wireless device may include a single antenna 825. However, in some cases the device may have more than one antenna 825, which may be capable of concurrently transmitting or receiving multiple wireless transmissions.

The memory 830 may include RAM and ROM. The memory 830 may store computer-readable, computer-executable code 835 including instructions that, when executed, cause the processor to perform various functions described herein. In some cases, the memory 830 may contain, among other things, a BIOS which may control basic hardware or software operation such as the interaction with peripheral components or devices.

The processor 840 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 840 may be configured to operate a memory array using a memory controller. In other cases, a memory controller may be integrated into the processor 840. The processor 840 may be configured to execute computer-readable instructions stored in a memory (e.g., the memory 830) to cause the device 805 to perform various functions (e.g., functions or tasks supporting channel state information reporting techniques for wide beams).

The code 835 may include instructions to implement aspects of the present disclosure, including instructions to support wireless communications. The code 835 may be stored in a non-transitory computer-readable medium such as system memory or other type of memory. In some cases, the code 835 may not be directly executable by the processor 840 but may cause a computer (e.g., when compiled and executed) to perform functions described herein.

Figure 9:
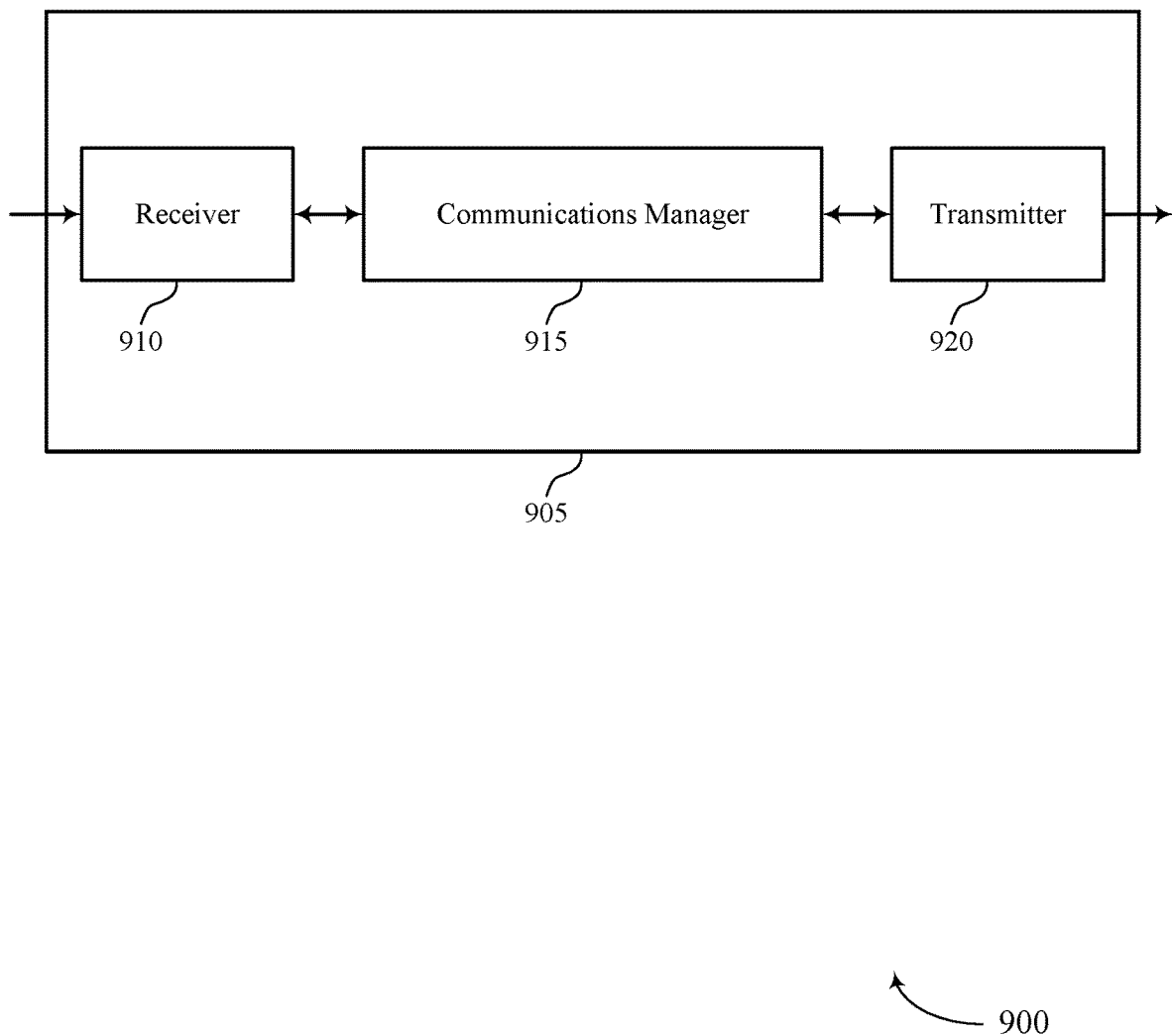
FIGS. 9 and 10 show block diagrams of devices that support channel state information reporting techniques for wide beams in accordance with aspects of the present disclosure.

FIG. 9 shows a block diagram 900 of a device 905 that supports channel state information reporting techniques for wide beams in accordance with aspects of the present disclosure. The device 905 may be an example of aspects of a base station 105 as described herein. The device 905 may include a receiver 910, a communications manager 915, and a transmitter 920. The device 905 may also include a processor. Each of these components may be in communication with one another (e.g., via one or more buses).

The receiver 910 may receive information such as packets, user data, or control information associated with various information channels (e.g., control channels, data channels, and information related to channel state information reporting techniques for wide beams, etc.). Information may be passed on to other components of the device 905. The receiver 910 may be an example of aspects of the transceiver 1220 described with reference to FIG. 12. The receiver 910 may utilize a single antenna or a set of antennas.

The communications manager 915 may transmit a reference signal to a UE for beamforming measurements at the UE, the beamforming measurements based on a set of available narrow beams that include a first narrow beam that has a first beam direction and a first beam width, receive from the UE, responsive to the reference signal, a set of wide beam parameters that indicate a second beam direction of a first wide beam and a second beam width of the first wide beam, where the second beam direction is based on the first beam direction and the second beam width is a multiple of the first beam width, and communicate with the UE using the first wide beam based on the set of wide beam parameters. The communications manager 915 may be an example of aspects of the communications manager 1210 described herein.

The communications manager 915, or its sub-components, may be implemented in hardware, code (e.g., software or firmware) executed by a processor, or any combination thereof. If implemented in code executed by a processor, the functions of the communications manager 915, or its sub-components may be executed by a general-purpose processor, a DSP, an application-specific integrated circuit (ASIC), a FPGA or other programmable logic device, discrete gate or transistor logic, discrete hardware components, or any combination thereof designed to perform the functions described in the present disclosure.

The communications manager 915, or its sub-components, may be physically located at various positions, including being distributed such that portions of functions are implemented at different physical locations by one or more physical components. In some examples, the communications manager 915, or its sub-components, may be a separate and distinct component in accordance with various aspects of the present disclosure. In some examples, the communications manager 915, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 920 may transmit signals generated by other components of the device 905. In some examples, the transmitter 920 may be collocated with a receiver 910 in a transceiver module. For example, the transmitter 920 may be an example of aspects of the transceiver 1220 described with reference to FIG. 12. The transmitter 920 may utilize a single antenna or a set of antennas.

Figure 10:
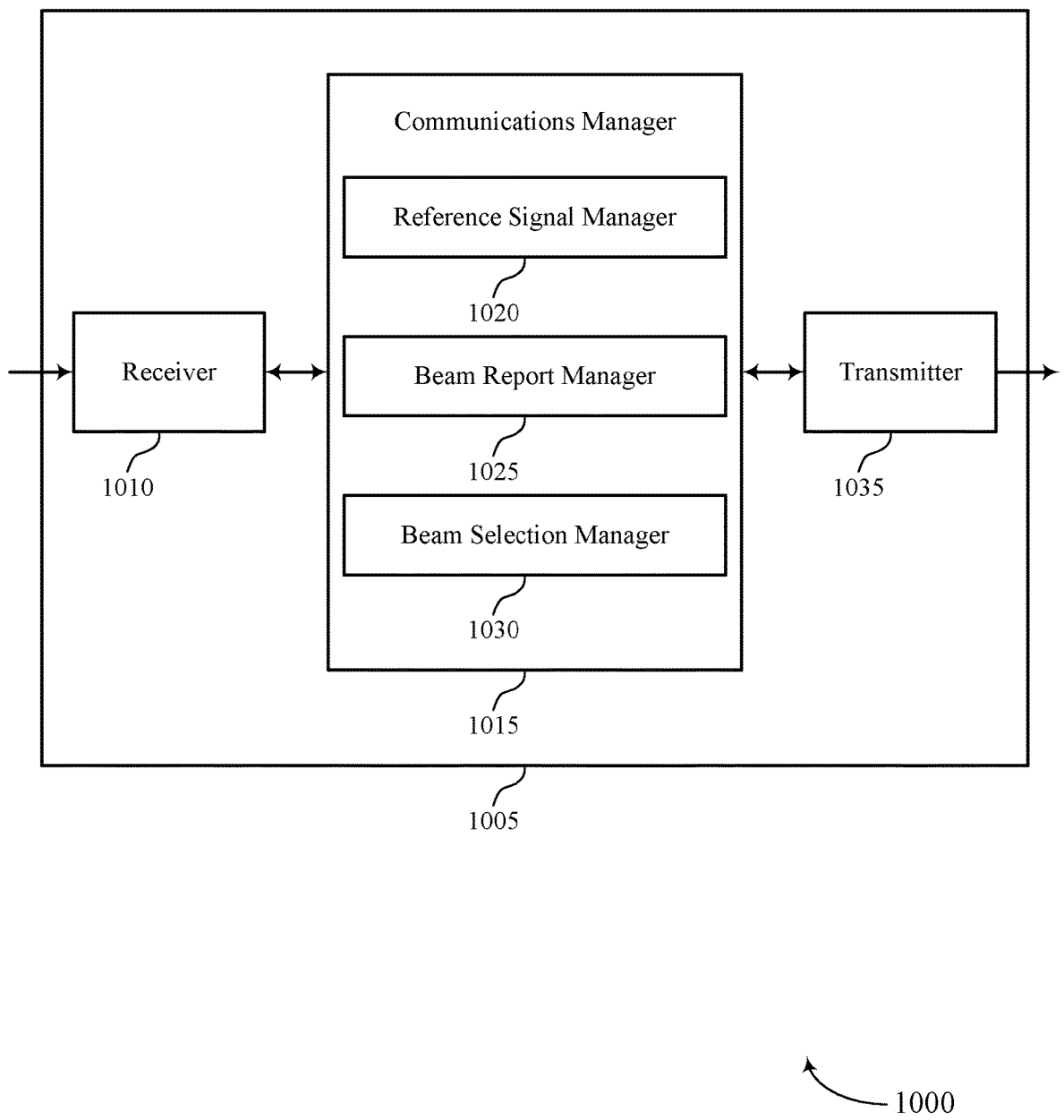

FIG. 10 shows a block diagram 1000 of a device 1005 that supports channel state information reporting techniques for wide beams in accordance with aspects of the present disclosure. The device 1005 may be an example of aspects of a device 905, or a base station 105 as described herein. The device 1005 may include a receiver 1010, a communications manager 1015, and a transmitter 1035. The device 1005 may also include a processor. Each of these components may be in communication with one another (e.g., via one or more buses).

The receiver 1010 may receive information such as packets, user data, or control information associated with various information channels (e.g., control channels, data channels, and information related to channel state information reporting techniques for wide beams, etc.). Information may be passed on to other components of the device 1005. The receiver 1010 may be an example of aspects of the transceiver 1220 described with reference to FIG. 12. The receiver 1010 may utilize a single antenna or a set of antennas.

The communications manager 1015 may be an example of aspects of the communications manager 915 as described herein. The communications manager 1015 may include a reference signal manager 1020, a beam report manager 1025, and a beam selection manager 1030. The communications manager 1015 may be an example of aspects of the communications manager 1210 described herein.

The reference signal manager 1020 may transmit a reference signal to a UE for beamforming measurements at the UE, the beamforming measurements based on a set of available narrow beams that include a first narrow beam that has a first beam direction and a first beam width.

The beam report manager 1025 may receive from the UE, responsive to the reference signal, a set of wide beam parameters that indicate a second beam direction of a first wide beam and a second beam width of the first wide beam, where the second beam direction is based on the first beam direction and the second beam width is a multiple of the first beam width.

The beam selection manager 1030 may communicate with the UE using the first wide beam based on the set of wide beam parameters.

The transmitter 1035 may transmit signals generated by other components of the device 1005. In some examples, the transmitter 1035 may be collocated with a receiver 1010 in a transceiver module. For example, the transmitter 1035 may be an example of aspects of the transceiver 1220 described with reference to FIG. 12. The transmitter 1035 may utilize a single antenna or a set of antennas.

Figure 11:
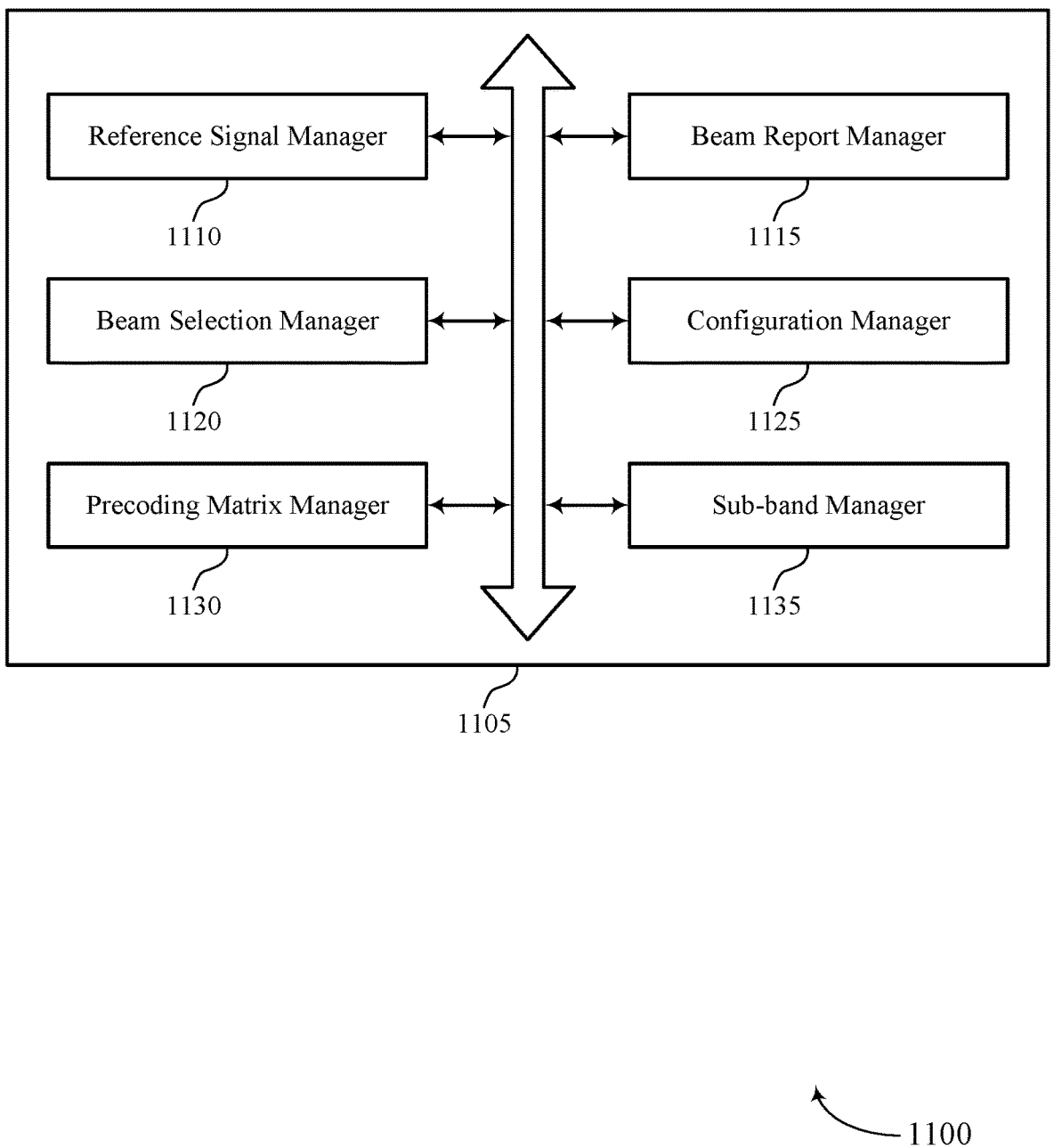
FIG. 11 shows a block diagram of a communications manager that supports channel state information reporting techniques for wide beams in accordance with aspects of the present disclosure.

FIG. 11 shows a block diagram 1100 of a communications manager 1105 that supports channel state information reporting techniques for wide beams in accordance with aspects of the present disclosure. The communications manager 1105 may be an example of aspects of a communications manager 915, a communications manager 1015, or a communications manager 1210 described herein. The communications manager 1105 may include a reference signal manager 1110, a beam report manager 1115, a beam selection manager 1120, a configuration manager 1125, a precoding matrix manager 1130, and a sub-band manager 1135. Each of these modules may communicate, directly or indirectly, with one another (e.g., via one or more buses).

The reference signal manager 1110 may transmit a reference signal to a UE for beamforming measurements at the UE, the beamforming measurements based on a set of available narrow beams that include a first narrow beam that has a first beam direction and a first beam width. In some cases, the reference signal is a CSI-RS that is transmitted without precoding.

The beam report manager 1115 may receive from the UE, responsive to the reference signal, a set of wide beam parameters that indicate a second beam direction of a first wide beam and a second beam width of the first wide beam, where the second beam direction is based on the first beam direction and the second beam width is a multiple of the first beam width. In some examples, the beam report manager 1115 may receive a CSI report that indicates a vertical beam direction, a vertical beam width, a horizontal beam direction, and a horizontal beam width of the first wide beam. In some examples, the beam report manager 1115 may receive the set of wide beam parameters for each of two or more transmission layers. In some examples, the beam report manager 1115 may receive one or more of a channel quality indicator value, a precoding matrix index value, a rank index value, or combinations thereof, that are associated with the set of wide beam parameters. In some examples, the beam report manager 1115 may receive the set of wide beam parameters for a first subset of transmission layers, and receiving one or more precoding codebook values for narrow beams for a second subset of transmission layers.

In some cases, the wide beam parameter report is provided in a CSI report that includes values for the second beam direction and the second beam width. In some cases, the second beam direction is an angle value of the first narrow beam that has a largest beamforming gain of the set of available narrow beams, and is represented by an angle value in the CSI report. In some cases, the second beam width is represented by the multiple of the first beam width that is generated by UE transmit antennas of the first narrow beam at the first beam direction. In some cases, the set of wide beam parameters include values for vertical beam direction and horizontal beam direction that are quantized based on a number of antenna elements at the UE, oversampling factors for vertical or horizontal beam directions, or any combinations thereof. In some cases, the set of wide beam parameters include values for vertical beam width and horizontal beam width that are quantized based on upper bounds for beam broadening for the vertical or horizontal beam directions, or any combinations thereof. In some cases, the set of wide beam parameters include separate horizontal and vertical beam direction values, and separate horizontal and vertical width values, for each of two or more transmission layers. In some cases, the set of wide beam parameters include a set of indices for a wide band of each transmission layer.

The beam selection manager 1120 may communicate with the UE using the first wide beam based on the set of wide beam parameters. In some cases, the UE is configured to select at least a first transmission layer of a set of transmission layers for wide beam communications and at least a second transmission layer of the set of transmission layers for narrow beam communications, and where the set of wide beam parameters includes an indication that identifies an associated transmission layer as being selected for wide beam communications.

The configuration manager 1125 may transmit, to the UE prior to transmitting the reference signal, configuration information for the reference signal and a wide beam parameter report for providing the set of wide beam parameters. In some examples, the configuration manager 1125 may transmit, to the UE, configuration information via RRC signaling, a MAC-CE, DCI, or any combinations thereof, where the configuration information provides a CSI report configuration for indication of the second beam direction and the second beam width, and for transmission of the set of wide beam parameters to the base station.

The precoding matrix manager 1130 may receive a wide beam codebook index value associated with the second beam direction and the multiple that provides the second beam width. In some examples, the precoding matrix manager 1130 may determine the set of wide beam parameters based on the wide beam codebook index value. In some examples, the precoding matrix manager 1130 may receive, from the UE, a PMI associated with a wide beam precoding matrix and a rank RI value that indicates an associated transmission layer. In some examples, the precoding matrix manager 1130 may receive one or more CQI values associated with the reference signal based on the PMI and the RI. In some cases, the second beam direction and the second beam width are determined based on a type-1 precoding codebook or a type-two precoding codebook that are configured at the UE by the base station. In some cases, the set of wide beam parameters are received from the UE in an enhanced PMI report. In some cases, a precoding vector for communications with the UE is determined based on the wide beam codebook index value.

The sub-band manager 1135 may manage beam parameters for one or multiple sub-bands. In some cases, the set of wide beam parameters are provided for two or more transmission layers, for two or more communication bandwidths, for two or more sub-bands of a set of sub-bands, or any combinations thereof. In some cases, the set of wide beam parameters include separate horizontal and vertical beam direction values, and separate horizontal and vertical width values, for each of two or more sub-bands. In some cases, the set of wide beam parameters include a set of indices for each of the two or more sub-bands and each transmission layer. In some cases, the set of wide beam parameters for each sub-band are reported as differential values relative to values of the wide band. In some cases, the set of wide beam parameters for a first subset of sub-bands are reported as differential values relative to values of a wide band, and the set of wide beam parameters for a second subset of sub-bands are reported as actual values of the wide beam parameters.

Figure 12:
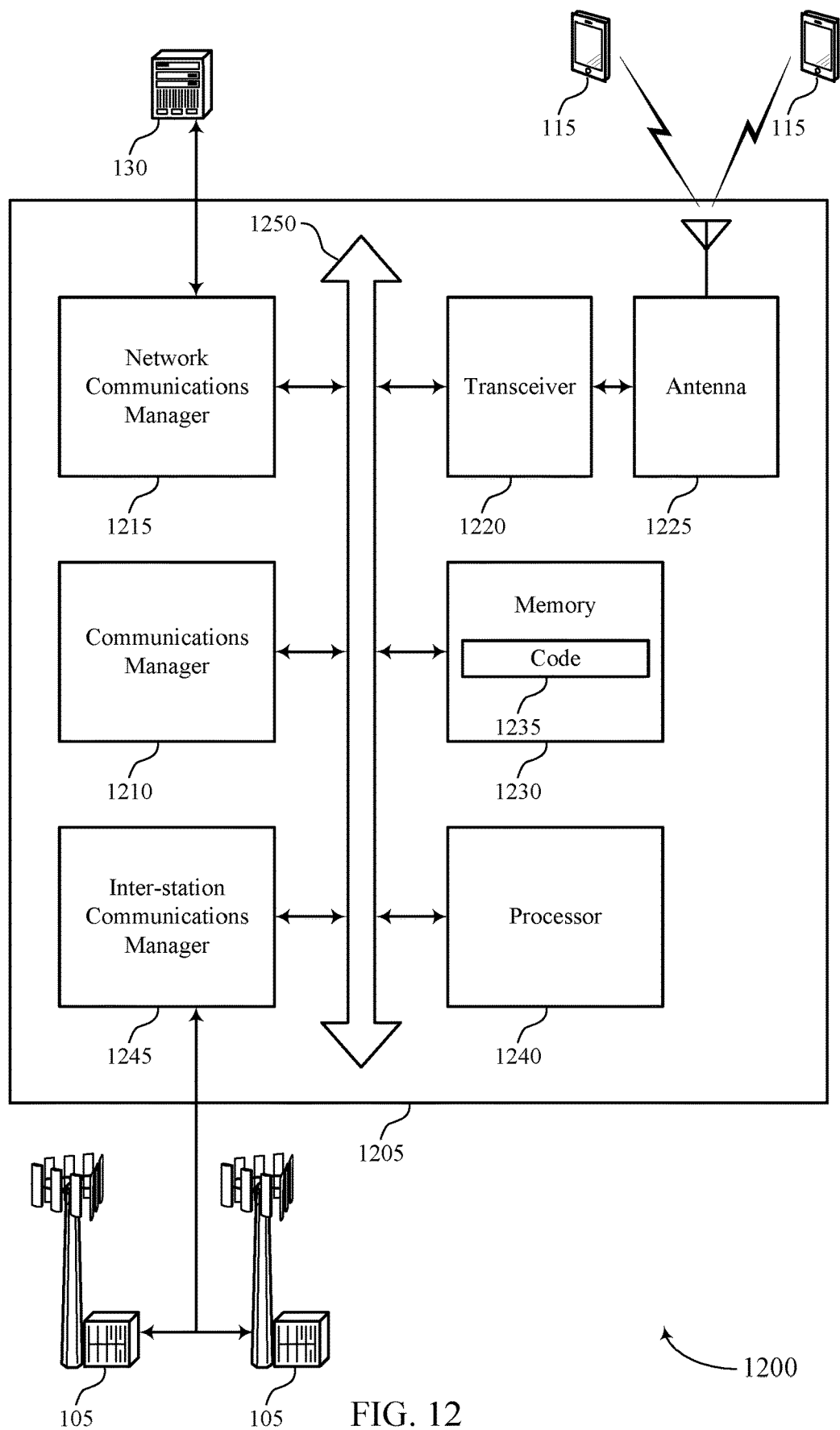
FIG. 12 shows a diagram of a system including a device that supports channel state information reporting techniques for wide beams in accordance with aspects of the present disclosure.

FIG. 12 shows a diagram of a system 1200 including a device 1205 that supports channel state information reporting techniques for wide beams in accordance with aspects of the present disclosure. The device 1205 may be an example of or include the components of device 905, device 1005, or a base station 105 as described herein. The device 1205 may include components for bi-directional voice and data communications including components for transmitting and receiving communications, including a communications manager 1210, a network communications manager 1215, a transceiver 1220, an antenna 1225, memory 1230, a processor 1240, and an inter-station communications manager 1245. These components may be in electronic communication via one or more buses (e.g., bus 1250).

The communications manager 1210 may transmit a reference signal to a UE for beamforming measurements at the UE, the beamforming measurements based on a set of available narrow beams that include a first narrow beam that has a first beam direction and a first beam width, receive from the UE, responsive to the reference signal, a set of wide beam parameters that indicate a second beam direction of a first wide beam and a second beam width of the first wide beam, where the second beam direction is based on the first beam direction and the second beam width is a multiple of the first beam width, and communicate with the UE using the first wide beam based on the set of wide beam parameters.

The network communications manager 1215 may manage communications with the core network (e.g., via one or more wired backhaul links). For example, the network communications manager 1215 may manage the transfer of data communications for client devices, such as one or more UEs 115.

The transceiver 1220 may communicate bi-directionally, via one or more antennas, wired, or wireless links as described above. For example, the transceiver 1220 may represent a wireless transceiver and may communicate bi-directionally with another wireless transceiver. The transceiver 1220 may also include a modem to modulate the packets and provide the modulated packets to the antennas for transmission, and to demodulate packets received from the antennas.

In some cases, the wireless device may include a single antenna 1225. However, in some cases the device may have more than one antenna 1225, which may be capable of concurrently transmitting or receiving multiple wireless transmissions.

The memory 1230 may include RAM, ROM, or a combination thereof. The memory 1230 may store computer-readable code 1235 including instructions that, when executed by a processor (e.g., the processor 1240) cause the device to perform various functions described herein. In some cases, the memory 1230 may contain, among other things, a BIOS which may control basic hardware or software operation such as the interaction with peripheral components or devices.

The processor 1240 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1240 may be configured to operate a memory array using a memory controller. In some cases, a memory controller may be integrated into processor 1240. The processor 1240 may be configured to execute computer-readable instructions stored in a memory (e.g., the memory 1230) to cause the device 1205 to perform various functions (e.g., functions or tasks supporting channel state information reporting techniques for wide beams).

The inter-station communications manager 1245 may manage communications with other base station 105, and may include a controller or scheduler for controlling communications with UEs 115 in cooperation with other base stations 105. For example, the inter-station communications manager 1245 may coordinate scheduling for transmissions to UEs 115 for various interference mitigation techniques such as beamforming or joint transmission. In some examples, the inter-station communications manager 1245 may provide an X2 interface within an LTE/LTE-A wireless communication network technology to provide communication between base stations 105.

The code 1235 may include instructions to implement aspects of the present disclosure, including instructions to support wireless communications. The code 1235 may be stored in a non-transitory computer-readable medium such as system memory or other type of memory. In some cases, the code 1235 may not be directly executable by the processor 1240 but may cause a computer (e.g., when compiled and executed) to perform functions described herein.

Figure 13:
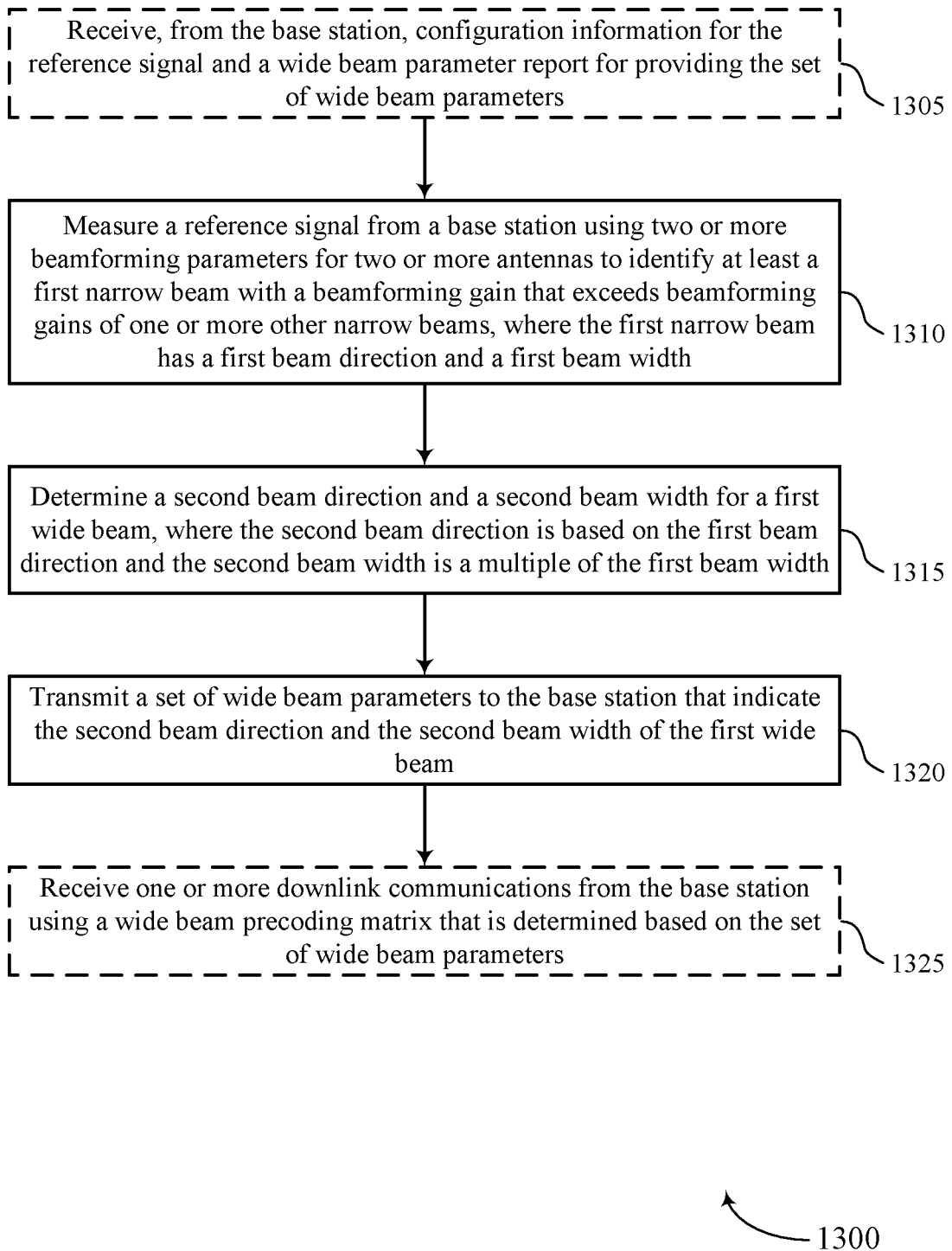
FIGS. 13 through 19 show flowcharts illustrating methods that support channel state information reporting techniques for wide beams in accordance with aspects of the present disclosure.

FIG. 13 shows a flowchart illustrating a method 1300 that supports channel state information reporting techniques for wide beams in accordance with aspects of the present disclosure. The operations of method 1300 may be implemented by a UE 115 or its components as described herein. For example, the operations of method 1300 may be performed by a communications manager as described with reference to FIGS. 5 through 8. In some examples, a UE may execute a set of instructions to control the functional elements of the UE to perform the functions described below. Additionally or alternatively, a UE may perform aspects of the functions described below using special-purpose hardware.

Optionally, at 1305, the UE may receive, from the base station, configuration information for the reference signal and a wide beam parameter report for providing the set of wide beam parameters. The operations of 1305 may be performed according to the methods described herein. In some examples, aspects of the operations of 1305 may be performed by a configuration manager as described with reference to FIGS. 5 through 8.

At 1310, the UE may measure a reference signal from a base station using two or more beamforming parameters for two or more antennas to identify at least a first narrow beam with a beamforming gain that exceeds beamforming gains of one or more other narrow beams, where the first narrow beam has a first beam direction and a first beam width. The operations of 1310 may be performed according to the methods described herein. In some examples, aspects of the operations of 1310 may be performed by a reference signal manager as described with reference to FIGS. 5 through 8.

At 1315, the UE may determine a second beam direction and a second beam width for a first wide beam, where the second beam direction is based on the first beam direction and the second beam width is a multiple of the first beam width. The operations of 1315 may be performed according to the methods described herein. In some examples, aspects of the operations of 1315 may be performed by a beam selection manager as described with reference to FIGS. 5 through 8.

At 1320, the UE may transmit a set of wide beam parameters to the base station that indicate the second beam direction and the second beam width of the first wide beam. The operations of 1320 may be performed according to the methods described herein. In some examples, aspects of the operations of 1320 may be performed by a beam report manager as described with reference to FIGS. 5 through 8.

Optionally, at 1325, the UE may receive one or more downlink communications from the base station using a wide beam precoding matrix that is determined based on the set of wide beam parameters. The operations of 1325 may be performed according to the methods described herein. In some examples, aspects of the operations of 1325 may be performed by a precoding matrix manager as described with reference to FIGS. 5 through 8.

Figure 14:
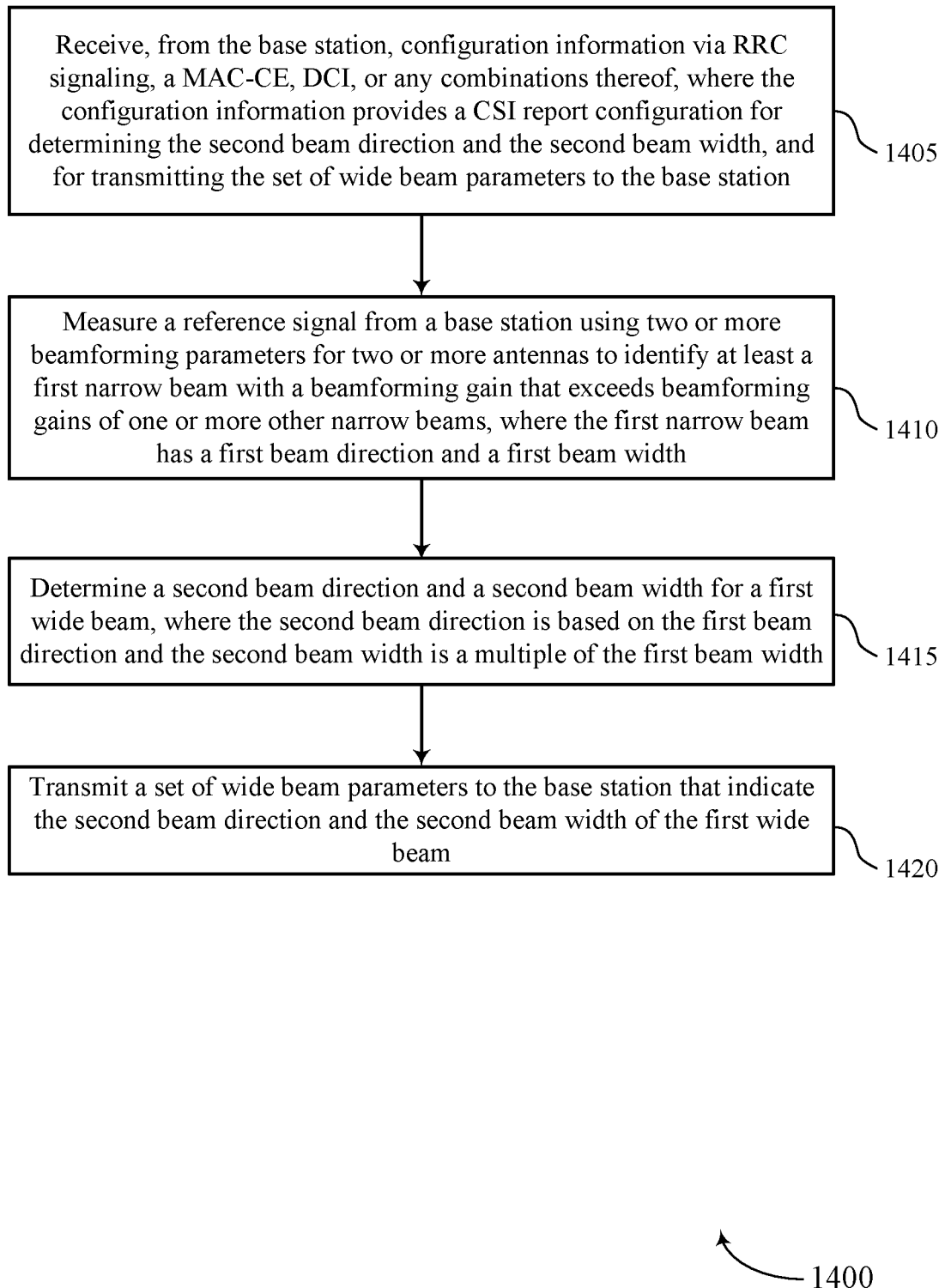

FIG. 14 shows a flowchart illustrating a method 1400 that supports channel state information reporting techniques for wide beams in accordance with aspects of the present disclosure. The operations of method 1400 may be implemented by a UE 115 or its components as described herein. For example, the operations of method 1400 may be performed by a communications manager as described with reference to FIGS. 5 through 8. In some examples, a UE may execute a set of instructions to control the functional elements of the UE to perform the functions described below. Additionally or alternatively, a UE may perform aspects of the functions described below using special-purpose hardware.

At 1405, the UE may receive, from the base station, configuration information via RRC signaling, a medium access control (MAC) control element, DCI, or any combinations thereof, where the configuration information provides a CSI report configuration for determining the second beam direction and the second beam width, and for transmitting the set of wide beam parameters to the base station. The operations of 1405 may be performed according to the methods described herein. In some examples, aspects of the operations of 1405 may be performed by a configuration manager as described with reference to FIGS. 5 through 8.

At 1410, the UE may measure a reference signal from a base station using two or more beamforming parameters for two or more antennas to identify at least a first narrow beam with a beamforming gain that exceeds beamforming gains of one or more other narrow beams, where the first narrow beam has a first beam direction and a first beam width. The operations of 1410 may be performed according to the methods described herein. In some examples, aspects of the operations of 1410 may be performed by a reference signal manager as described with reference to FIGS. 5 through 8. In some cases, the reference signal is a channel state information reference signal (CSI-RS) that is transmitted without precoding.

At 1415, the UE may determine a second beam direction and a second beam width for a first wide beam, where the second beam direction is based on the first beam direction and the second beam width is a multiple of the first beam width. The operations of 1415 may be performed according to the methods described herein. In some examples, aspects of the operations of 1415 may be performed by a beam selection manager as described with reference to FIGS. 5 through 8.

At 1420, the UE may transmit a set of wide beam parameters to the base station that indicate the second beam direction and the second beam width of the first wide beam. The operations of 1420 may be performed according to the methods described herein. In some examples, aspects of the operations of 1420 may be performed by a beam report manager as described with reference to FIGS. 5 through 8. In some cases, the set of wide beam parameters include values for vertical beam direction and horizontal beam direction that are quantized based on a number of antenna elements at the UE, oversampling factors for vertical or horizontal beam directions, or any combinations thereof. In some cases, the set of wide beam parameters include values for vertical beam width and horizontal beam width that are quantized based on upper bounds for beam broadening for the vertical or horizontal beam directions, or any combinations thereof.

Figure 15:
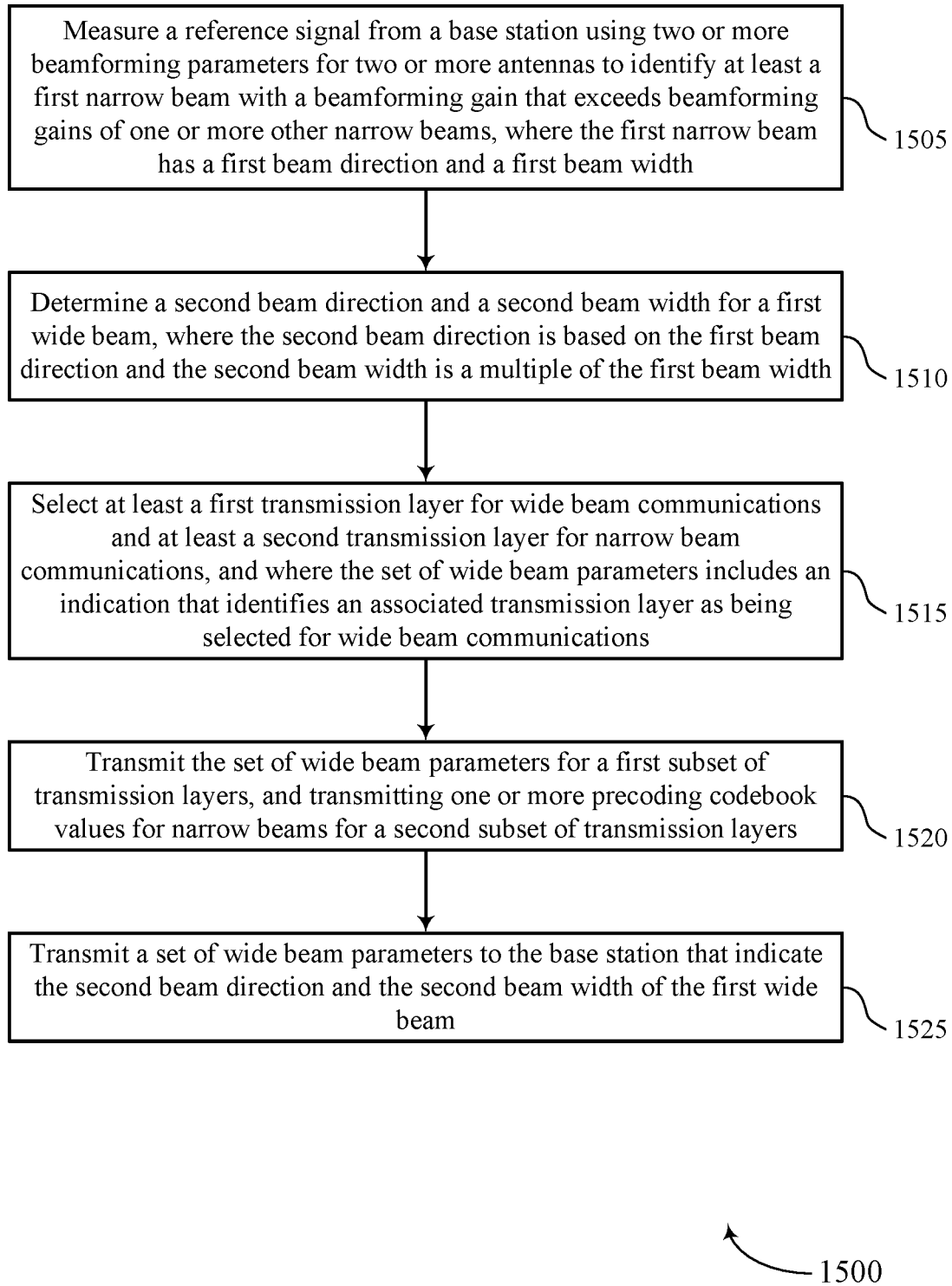

FIG. 15 shows a flowchart illustrating a method 1500 that supports channel state information reporting techniques for wide beams in accordance with aspects of the present disclosure. The operations of method 1500 may be implemented by a UE 115 or its components as described herein. For example, the operations of method 1500 may be performed by a communications manager as described with reference to FIGS. 5 through 8. In some examples, a UE may execute a set of instructions to control the functional elements of the UE to perform the functions described below. Additionally or alternatively, a UE may perform aspects of the functions described below using special-purpose hardware.

At 1505, the UE may measure a reference signal from a base station using two or more beamforming parameters for two or more antennas to identify at least a first narrow beam with a beamforming gain that exceeds beamforming gains of one or more other narrow beams, where the first narrow beam has a first beam direction and a first beam width. The operations of 1505 may be performed according to the methods described herein. In some examples, aspects of the operations of 1505 may be performed by a reference signal manager as described with reference to FIGS. 5 through 8.

At 1510, the UE may determine a second beam direction and a second beam width for a first wide beam, where the second beam direction is based on the first beam direction and the second beam width is a multiple of the first beam width. The operations of 1510 may be performed according to the methods described herein. In some examples, aspects of the operations of 1510 may be performed by a beam selection manager as described with reference to FIGS. 5 through 8.

At 1515, the UE may select at least a first transmission layer for wide beam communications and at least a second transmission layer for narrow beam communications, and where the set of wide beam parameters includes an indication that identifies an associated transmission layer as being selected for wide beam communications. The operations of 1515 may be performed according to the methods described herein. In some examples, aspects of the operations of 1515 may be performed by a beam selection manager as described with reference to FIGS. 5 through 8.

At 1520, the UE may transmit the set of wide beam parameters for a first subset of transmission layers, and transmitting one or more precoding codebook values for narrow beams for a second subset of transmission layers. The operations of 1520 may be performed according to the methods described herein. In some examples, aspects of the operations of 1520 may be performed by a beam report manager as described with reference to FIGS. 5 through 8.

At 1525, the UE may transmit a set of wide beam parameters to the base station that indicate the second beam direction and the second beam width of the first wide beam. The operations of 1525 may be performed according to the methods described herein. In some examples, aspects of the operations of 1525 may be performed by a beam report manager as described with reference to FIGS. 5 through 8.

Figure 16:
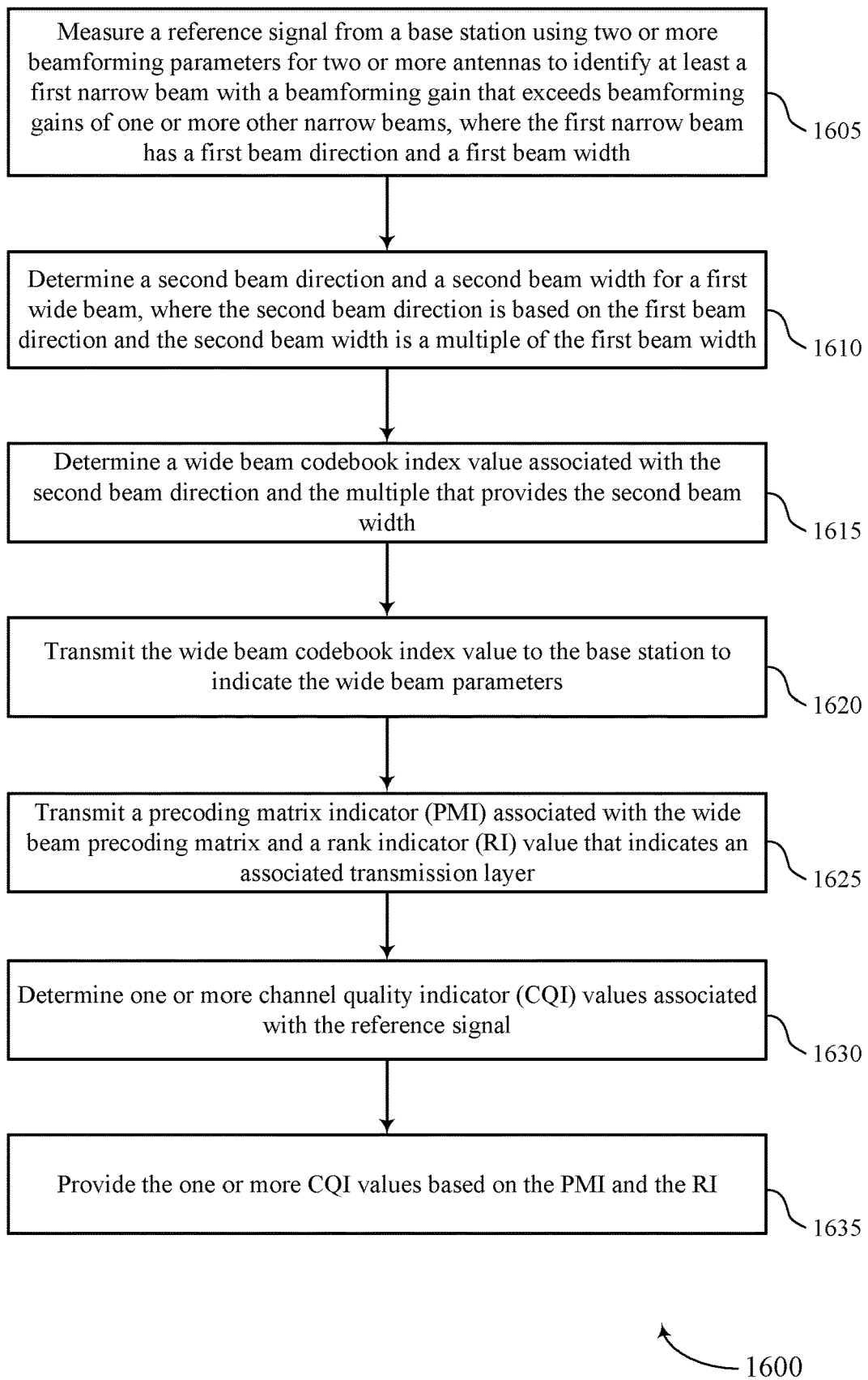

FIG. 16 shows a flowchart illustrating a method 1600 that supports channel state information reporting techniques for wide beams in accordance with aspects of the present disclosure. The operations of method 1600 may be implemented by a UE 115 or its components as described herein. For example, the operations of method 1600 may be performed by a communications manager as described with reference to FIGS. 5 through 8. In some examples, a UE may execute a set of instructions to control the functional elements of the UE to perform the functions described below. Additionally or alternatively, a UE may perform aspects of the functions described below using special-purpose hardware.

At 1605, the UE may measure a reference signal from a base station using two or more beamforming parameters for two or more antennas to identify at least a first narrow beam with a beamforming gain that exceeds beamforming gains of one or more other narrow beams, where the first narrow beam has a first beam direction and a first beam width. The operations of 1605 may be performed according to the methods described herein. In some examples, aspects of the operations of 1605 may be performed by a reference signal manager as described with reference to FIGS. 5 through 8.

At 1610, the UE may determine a second beam direction and a second beam width for a first wide beam, where the second beam direction is based on the first beam direction and the second beam width is a multiple of the first beam width. The operations of 1610 may be performed according to the methods described herein. In some examples, aspects of the operations of 1610 may be performed by a beam selection manager as described with reference to FIGS. 5 through 8.

At 1615, the UE may determine a wide beam codebook index value associated with the second beam direction and the multiple that provides the second beam width. The operations of 1615 may be performed according to the methods described herein. In some examples, aspects of the operations of 1615 may be performed by a precoding matrix manager as described with reference to FIGS. 5 through 8.

At 1620, the UE may transmit the wide beam codebook index value to the base station to indicate the wide beam parameters. The operations of 1620 may be performed according to the methods described herein. In some examples, aspects of the operations of 1620 may be performed by a precoding matrix manager as described with reference to FIGS. 5 through 8. In some cases, a precoding vector for communications with the base station is determined based on the wide beam codebook index value.

At 1625, the UE may transmit a precoding matrix indicator (PMI) associated with the wide beam precoding matrix and a rank indicator (RI) value that indicates an associated transmission layer. The operations of 1625 may be performed according to the methods described herein. In some examples, aspects of the operations of 1625 may be performed by a precoding matrix manager as described with reference to FIGS. 5 through 8.

At 1630, the UE may determine one or more channel quality indicator (CQI) values associated with the reference signal. The operations of 1630 may be performed according to the methods described herein. In some examples, aspects of the operations of 1630 may be performed by a precoding matrix manager as described with reference to FIGS. 5 through 8.

At 1635, the UE may provide the one or more CQI values based on the PMI and the RI. The operations of 1635 may be performed according to the methods described herein. In some examples, aspects of the operations of 1635 may be performed by a precoding matrix manager as described with reference to FIGS. 5 through 8.

Figure 17:
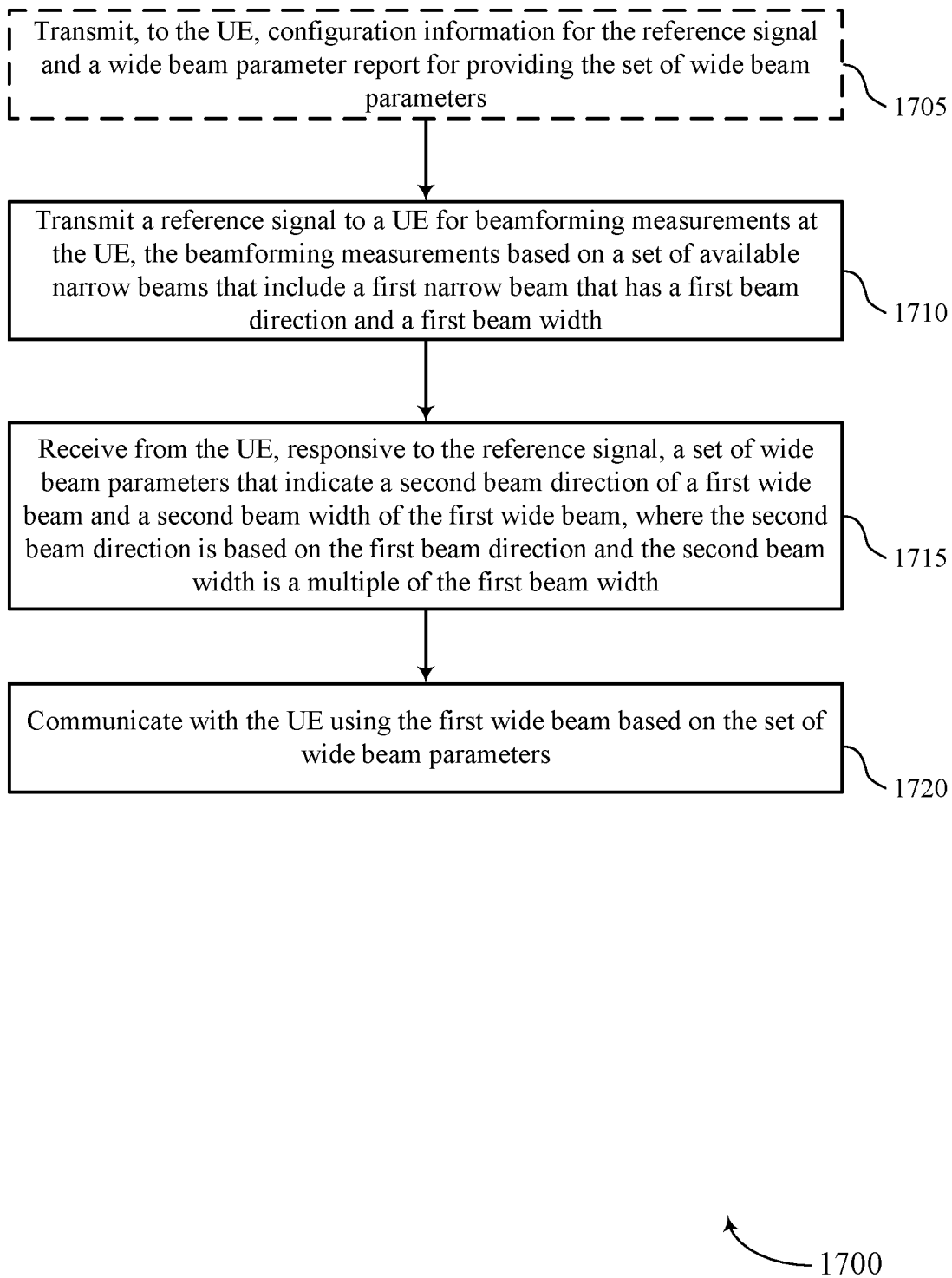

FIG. 17 shows a flowchart illustrating a method 1700 that supports channel state information reporting techniques for wide beams in accordance with aspects of the present disclosure. The operations of method 1700 may be implemented by a base station 105 or its components as described herein. For example, the operations of method 1700 may be performed by a communications manager as described with reference to FIGS. 9 through 12. In some examples, a base station may execute a set of instructions to control the functional elements of the base station to perform the functions described below. Additionally or alternatively, a base station may perform aspects of the functions described below using special-purpose hardware.

Optionally, at 1705, the base station may transmit, to the UE, configuration information for the reference signal and a wide beam parameter report for providing the set of wide beam parameters. The operations of 1705 may be performed according to the methods described herein. In some examples, aspects of the operations of 1705 may be performed by a configuration manager as described with reference to FIGS. 9 through 12.

At 1710, the base station may transmit a reference signal to a UE for beamforming measurements at the UE, the beamforming measurements based on a set of available narrow beams that include a first narrow beam that has a first beam direction and a first beam width. The operations of 1710 may be performed according to the methods described herein. In some examples, aspects of the operations of 1710 may be performed by a reference signal manager as described with reference to FIGS. 9 through 12.

At 1715, the base station may receive from the UE, responsive to the reference signal, a set of wide beam parameters that indicate a second beam direction of a first wide beam and a second beam width of the first wide beam, where the second beam direction is based on the first beam direction and the second beam width is a multiple of the first beam width. The operations of 1715 may be performed according to the methods described herein. In some examples, aspects of the operations of 1715 may be performed by a beam report manager as described with reference to FIGS. 9 through 12. In some cases, a wide beam parameter report is provided in a CSI report that includes values for the second beam direction and the second beam width. In some cases, the second beam direction is an angle value of the first narrow beam that has a largest beamforming gain of the set of available narrow beams, and is represented by an angle value in the CSI report. In some cases, the second beam width is represented by the multiple of the first beam width that is generated by UE transmit antennas of the first narrow beam at the first beam direction.

At 1720, the base station may communicate with the UE using the first wide beam based on the set of wide beam parameters. The operations of 1720 may be performed according to the methods described herein. In some examples, aspects of the operations of 1720 may be performed by a beam selection manager as described with reference to FIGS. 9 through 12.

Figure 18:
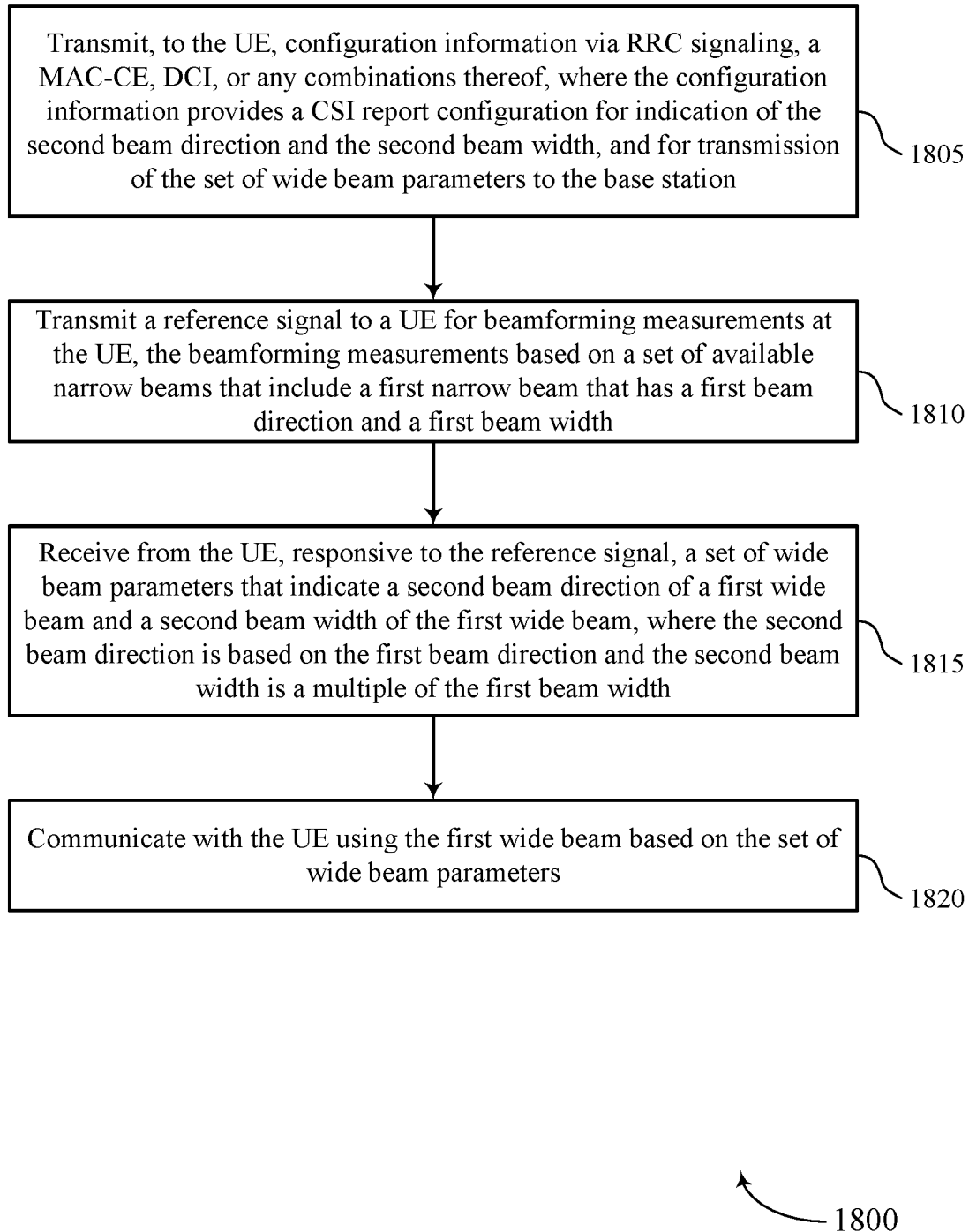

FIG. 18 shows a flowchart illustrating a method 1800 that supports channel state information reporting techniques for wide beams in accordance with aspects of the present disclosure. The operations of method 1800 may be implemented by a base station 105 or its components as described herein. For example, the operations of method 1800 may be performed by a communications manager as described with reference to FIGS. 9 through 12. In some examples, a base station may execute a set of instructions to control the functional elements of the base station to perform the functions described below. Additionally or alternatively, a base station may perform aspects of the functions described below using special-purpose hardware.

At 1805, the base station may transmit, to the UE, configuration information via RRC signaling, a medium access control (MAC) control element, DCI, or any combinations thereof, where the configuration information provides a CSI report configuration for indication of the second beam direction and the second beam width, and for transmission of the set of wide beam parameters to the base station. The operations of 1805 may be performed according to the methods described herein. In some examples, aspects of the operations of 1805 may be performed by a configuration manager as described with reference to FIGS. 9 through 12.

At 1810, the base station may transmit a reference signal to a UE for beamforming measurements at the UE, the beamforming measurements based on a set of available narrow beams that include a first narrow beam that has a first beam direction and a first beam width. The operations of 1810 may be performed according to the methods described herein. In some examples, aspects of the operations of 1810 may be performed by a reference signal manager as described with reference to FIGS. 9 through 12.

At 1815, the base station may receive from the UE, responsive to the reference signal, a set of wide beam parameters that indicate a second beam direction of a first wide beam and a second beam width of the first wide beam, where the second beam direction is based on the first beam direction and the second beam width is a multiple of the first beam width. The operations of 1815 may be performed according to the methods described herein. In some examples, aspects of the operations of 1815 may be performed by a beam report manager as described with reference to FIGS. 9 through 12.

At 1820, the base station may communicate with the UE using the first wide beam based on the set of wide beam parameters. The operations of 1820 may be performed according to the methods described herein. In some examples, aspects of the operations of 1820 may be performed by a beam selection manager as described with reference to FIGS. 9 through 12.

Figure 19:
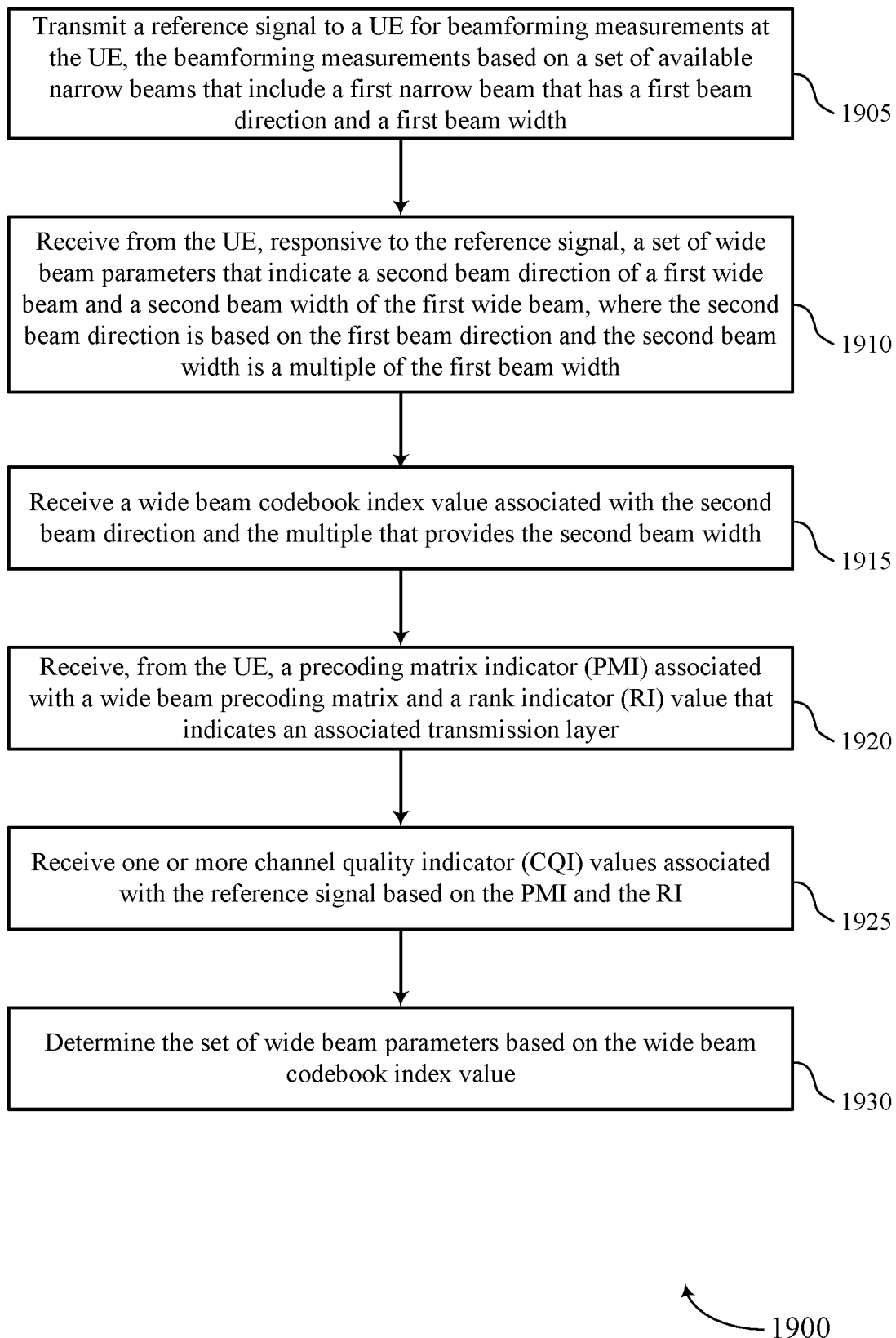

FIG. 19 shows a flowchart illustrating a method 1900 that supports channel state information reporting techniques for wide beams in accordance with aspects of the present disclosure. The operations of method 1900 may be implemented by a base station 105 or its components as described herein. For example, the operations of method 1900 may be performed by a communications manager as described with reference to FIGS. 9 through 12. In some examples, a base station may execute a set of instructions to control the functional elements of the base station to perform the functions described below. Additionally or alternatively, a base station may perform aspects of the functions described below using special-purpose hardware.

At 1905, the base station may transmit a reference signal to a UE for beamforming measurements at the UE, the beamforming measurements based on a set of available narrow beams that include a first narrow beam that has a first beam direction and a first beam width. The operations of 1905 may be performed according to the methods described herein. In some examples, aspects of the operations of 1905 may be performed by a reference signal manager as described with reference to FIGS. 9 through 12.

At 1910, the base station may receive from the UE, responsive to the reference signal, a set of wide beam parameters that indicate a second beam direction of a first wide beam and a second beam width of the first wide beam, where the second beam direction is based on the first beam direction and the second beam width is a multiple of the first beam width. The operations of 1910 may be performed according to the methods described herein. In some examples, aspects of the operations of 1910 may be performed by a beam report manager as described with reference to FIGS. 9 through 12.

At 1915, the base station may communicate with the UE using the first wide beam based on the set of wide beam parameters. The operations of 1915 may be performed according to the methods described herein. In some examples, aspects of the operations of 1915 may be performed by a beam selection manager as described with reference to FIGS. 9 through 12.

At 1920, the base station may receive, from the UE, a precoding matrix indicator (PMI) associated with a wide beam precoding matrix and a rank indicator (RI) value that indicates an associated transmission layer. The operations of 1920 may be performed according to the methods described herein. In some examples, aspects of the operations of 1920 may be performed by a precoding matrix manager as described with reference to FIGS. 9 through 12.

At 1925, the base station may receive one or more channel quality indicator (CQI) values associated with the reference signal based on the PMI and the RI. The operations of 1925 may be performed according to the methods described herein. In some examples, aspects of the operations of 1925 may be performed by a precoding matrix manager as described with reference to FIGS. 9 through 12.

At 1930, the base station may determine the set of wide beam parameters based on the wide beam codebook index value. The operations of 1930 may be performed according to the methods described herein. In some examples, aspects of the operations of 1930 may be performed by a precoding matrix manager as described with reference to FIGS. 9 through 12. In some cases, a precoding vector for communications with the UE is determined based on the wide beam codebook index value.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special purpose computer. By way of example, and not limitation, non-transitory computer-readable media may include random-access memory (RAM), read-only memory (ROM), electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communications at a user equipment (UE), comprising:
   measuring, at the UE, a reference signal from a network entity using two or more beamforming parameters for two or more antennas to identify at least a first narrow beam with a beamforming gain that exceeds beamforming gains of one or more other narrow beams, wherein the first narrow beam has a first beam direction and a first beam width;
   determining, at the UE, a second beam direction and a second beam width for a first wide beam, wherein the second beam direction is based at least in part on the first beam direction and the second beam width is a multiple of the first beam width and based at least in part on the first beam width; and
   transmitting a set of wide beam parameters to the network entity that indicate the second beam direction and the second beam width of the first wide beam.

2. The method of claim 1, further comprising:
   receiving, from the network entity, configuration information for the reference signal and a wide beam parameter report for providing the set of wide beam parameters.

3. The method of claim 2, wherein the wide beam parameter report is provided in a channel state information (CSI) report that includes values for the second beam direction and the second beam width.

4. The method of claim 3, wherein the second beam direction is an angle value of the first narrow beam that has a largest beamforming gain of the one or more other narrow beams, and is represented by an angle value in the CSI report.

5. The method of claim 3, wherein the second beam width is represented by the multiple of the first beam width that is generated by transmit antennas of the first narrow beam at the first beam direction.

6. The method of claim 1, wherein the transmitting comprises:
   transmitting a channel state information (CSI) report that indicates a vertical beam direction, a vertical beam width, a horizontal beam direction, and a horizontal beam width of the first wide beam.

7. The method of claim 1, wherein the transmitting comprises:
   transmitting the set of wide beam parameters for each of two or more transmission layers.

8. The method of claim 1, wherein the transmitting comprises:
   transmitting one or more of a channel quality indicator value, a precoding matrix index value, a rank index value, or combinations thereof, that are associated with the set of wide beam parameters.

9. The method of claim 1, further comprising:
   receiving one or more downlink communications from the network entity using a wide beam precoding matrix that is determined based at least in part on the set of wide beam parameters.

10. The method of claim 1, wherein the second beam direction and the second beam width are determined based at least in part on a type-1 precoding codebook or a type-two precoding codebook that are configured by the network entity.

11. The method of claim 1, wherein the set of wide beam parameters are transmitted in an enhanced precoding matrix indicator (PMI) report.

12. The method of claim 1, wherein the set of wide beam parameters are determined and reported for two or more transmission layers, for two or more communication bandwidths, for two or more sub-bands of a set of sub-bands, or any combinations thereof.

13. The method of claim 1, wherein the reference signal is a channel state information reference signal (CSI-RS) that is transmitted without precoding.

14. The method of claim 1, wherein the set of wide beam parameters include values for vertical beam direction and horizontal beam direction that are quantized based on a number of antenna elements at the UE, oversampling factors for vertical or horizontal beam directions, or any combinations thereof.

15. The method of claim 1, wherein the set of wide beam parameters include values for vertical beam width and horizontal beam width that are quantized based on upper bounds for beam broadening for vertical or horizontal beam directions, or any combinations thereof.

16. The method of claim 1, wherein the set of wide beam parameters include separate horizontal and vertical beam direction values, and separate horizontal and vertical width values, for each of two or more sub-bands.

17. The method of claim 16, wherein the set of wide beam parameters include a plurality of indices for each of the two or more sub-bands and each transmission layer, or a plurality of indices for a wide band of each transmission layer.

18. The method of claim 16, wherein the set of wide beam parameters for each sub-band are reported as differential values relative to values of a wide band of each transmission layer.

19. The method of claim 16, wherein the set of wide beam parameters for a first subset of sub-bands are reported as differential values relative to values of a wide band, and the set of wide beam parameters for a second subset of sub-bands are reported as actual values of the wide beam parameters.

20. The method of claim 1, wherein the transmitting comprises:
transmitting the set of wide beam parameters for a first subset of transmission layers, and transmitting one or more precoding codebook values for narrow beams for a second subset of transmission layers.

21. The method of claim 1, wherein the transmitting further comprises:
determining a wide beam codebook index value associated with the second beam direction and the multiple that provides the second beam width; and
transmitting the wide beam codebook index value to indicate the wide beam parameters.

22. The method of claim 21, further comprising:
determining, based at least in part on the second beam direction and the second beam width, a wide beam precoding matrix; and
transmitting a precoding matrix indicator (PMI) associated with the wide beam precoding matrix and a rank indicator (RI) value that indicates an associated transmission layer.

23. A method for wireless communications at a network entity, comprising:
transmitting a plurality of reference signals via a plurality of narrow beams to a user equipment (UE) for beamforming measurements at the UE, the plurality of available narrow beams including a first narrow beam that has a first beam direction and a first beam width;
receiving from the UE, subsequent to transmission of the plurality of reference signals, a set of wide beam parameters that indicate a second beam direction of a first wide beam and a second beam width of the first wide beam, wherein the second beam direction is based at least in part on the first beam direction and the second beam width is a multiple of the first beam width and based at least in part on the first beam width; and
communicating with the UE using the first wide beam based at least in part on the set of wide beam parameters.

24. The method of claim 23, further comprising:
transmitting, to the UE prior to transmitting the reference signal, configuration information for the reference signal and a wide beam parameter report for providing the set of wide beam parameters.

25. The method of claim 23, wherein the receiving comprises:
receiving a channel state information (CSI) report that indicates a vertical beam direction, a vertical beam width, a horizontal beam direction, and a horizontal beam width of the first wide beam.

26. The method of claim 23, wherein the receiving comprises:
receiving the set of wide beam parameters for each of two or more transmission layers.

27. An apparatus for wireless communications at a user equipment (UE), comprising:
one or more processors,
one or more memories coupled with the one or more processors; and
instructions stored in the one or more memories and executable by the one or more processors to cause the apparatus to:
measure, at the UE, a reference signal from a network entity using two or more beamforming parameters for two or more antennas to identify at least a first narrow beam with a beamforming gain that exceeds beamforming gains of one or more other narrow beams, wherein the first narrow beam has a first beam direction and a first beam width;
determine, at the UE, a second beam direction and a second beam width for a first wide beam, wherein the second beam direction is based at least in part on the first beam direction and the second beam width is a multiple of the first beam width and based at least in part on the first beam width; and
transmit a set of wide beam parameters to the network entity that indicate the second beam direction and the second beam width of the first wide beam.

28. The apparatus of claim 27, wherein the instructions are further executable by the one or more processors to cause the apparatus to:
receive, from the network entity, configuration information for the reference signal and a wide beam parameter report for providing the set of wide beam parameters.

29. The apparatus of claim 28, wherein the wide beam parameter report is provided in a channel state information (CSI) report that includes values for the second beam direction and the second beam width.

30. The apparatus of claim 29, wherein the second beam direction is an angle value of the first narrow beam that has a largest beamforming gain of the one or more other narrow beams, and is represented by an angle value in the CSI report.

31. The apparatus of claim 29, wherein the second beam width is represented by the multiple of the first beam width that is generated by transmit antennas of the first narrow beam at the first beam direction.

32. The apparatus of claim 27, wherein the instructions are further executable by the one or more processors to cause the apparatus to:
transmit a channel state information (CSI) report that indicates a vertical beam direction, a vertical beam width, a horizontal beam direction, and a horizontal beam width of the first wide beam.

33. An apparatus for wireless communications at a network entity, comprising:
one or more processors,
one or more memories coupled with the one or more processors; and
instructions stored in the one or more memories and executable by the one or more processors to cause the apparatus to
transmit a plurality of reference signals via a plurality of narrow beams to a user equipment (UE) for beamforming measurements at the UE, the plurality of narrow beams including a first narrow beam that has a first beam direction and a first beam width;
receive from the UE, subsequent to transmission of the plurality of reference signals, a set of wide beam parameters that indicate a second beam direction of a first wide beam and a second beam width of the first wide beam, wherein the second beam direction is based at least in part on the first beam direction and the second beam width is a multiple of the first beam width and based at least in part on the first beam width; and
communicate with the UE using the first wide beam based at least in part on the set of wide beam parameters.

34. The apparatus of claim 33, wherein the instructions are further executable by the one or more processors to cause the apparatus to:
transmit, to the UE prior to transmitting the reference signal, configuration information for the reference signal and a wide beam parameter report for providing the set of wide beam parameters.

35. An apparatus for wireless communications at a user equipment (UE), comprising:
means for measuring, at the UE, a reference signal from a network entity using two or more beamforming parameters for two or more antennas to identify at least a first narrow beam with a beamforming gain that exceeds beamforming gains of one or more other narrow beams, wherein the first narrow beam has a first beam direction and a first beam width;
means for determining, at the UE, a second beam direction and a second beam width for a first wide beam, wherein the second beam direction is based at least in part on the first beam direction and the second beam width is a multiple of the first beam width and based at least in part on the first beam width; and
means for transmitting a set of wide beam parameters to the network entity that indicate the second beam direction and the second beam width of the first wide beam.

* * * * *